(12) United States Patent
Yamanashi

(10) Patent No.: US 6,631,034 B2
(45) Date of Patent: Oct. 7, 2003

(54) ZOOM LENS SYSTEM

(75) Inventor: Takanori Yamanashi, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 98 days.

(21) Appl. No.: 09/862,310

(22) Filed: May 23, 2001

(65) Prior Publication Data

US 2002/0008919 A1 Jan. 24, 2002

(30) Foreign Application Priority Data

May 23, 2000 (JP) ........................................ 2000-151537

(51) Int. Cl.$^7$ ................................................ G02B 15/22
(52) U.S. Cl. .................... 359/684; 359/683; 359/685
(58) Field of Search ................................ 359/683, 684, 359/685

(56) References Cited

U.S. PATENT DOCUMENTS

| | | | |
|---|---|---|---|
| 3,682,534 A | | 8/1972 | Cook et al. |
| 4,299,454 A | | 11/1981 | Betensky |
| 4,560,254 A | | 12/1985 | Doi et al. |
| 4,844,600 A | * | 7/1989 | Tokumaru ............... 359/684 |
| 4,896,950 A | | 1/1990 | Endo et al. |
| 4,963,006 A | * | 10/1990 | Inadome ............... 359/684 |
| 5,585,969 A | * | 12/1996 | Endo ............... 359/683 |
| 5,724,192 A | * | 3/1998 | Lee ............... 359/689 |
| 6,061,180 A | * | 5/2000 | Hayakawa ............... 359/557 |

FOREIGN PATENT DOCUMENTS

| | | | |
|---|---|---|---|
| JP | B 58-33531 | * | 7/1983 |
| JP | B 02-48087 | * | 10/1990 |
| JP | 6-148520 | | 5/1994 |
| JP | 7-20381 | | 1/1995 |

* cited by examiner

Primary Examiner—Scott J. Sugarman
Assistant Examiner—Deborah Raizen
(74) Attorney, Agent, or Firm—Pillsbury Winthrop LLP

(57) ABSTRACT

A compact zoom lens system maintains sufficient image-formation capabilities at a wide-angle end of greater than 700 and at a zoom ratio of greater than about 10. The zoom lens system comprises a positive first lens group, a negative second lens group, a positive third lens group, a negative fourth lens group, and a positive fifth lens group. For zooming from a wide-angle end to a telephoto end, the first to fifth lens groups are all movable. The first and third lens groups move toward the object side. Also, the spaces between the first and second lens groups and between the third and fourth lens groups widen. At least the fourth lens group or the fifth lens group makes a non-linear movement, compensating for a fluctuation of an image plane position with zooming. Focusing is carried out by moving the first and second lens groups as an integral unit.

21 Claims, 9 Drawing Sheets

ZOOM LENS SYSTEM

This application claims benefit of Japanese Patent Application No. 2000-151537 filed in Japan on May 23, 2000, the contents of which are incorporated by reference.

BACKGROUND OF THE INVENTION

The present invention relates generally to a zoom lens, and more particularly to a wide-angle, high-magnification zoom lens system well fit for cameras, etc.

High-magnification zoom lenses for cameras have been developed in the fields of studio television cameras and chine cameras for a relatively long time now. With the widespread use of video cameras, zoom lenses for commercial use and domestic use have been under development. For zoom lens systems having high magnifications yet a field angle of 70° or greater on the wide-angle side, it is known that a sophisticated level of optical design is needed. One well-established type of zoom lens system is comprised of, in order from its object side, a first lens group having positive refracting power, a second lens group having negative refracting power, a third lens group having positive refracting power and a fourth lens group having positive refracting power, as typically set forth in JP-B 02-48087. This zoom lens system is characterized in that the first and fourth lens groups remain fixed during zooming.

This type has been extended to a version where a front converter is located in the first lens group, as typically disclosed in U.S. Pat. No. 3,682,534. These zoom lens systems have comprised a number of lenses and so increased in size. The first lens group has mainly been used for focusing.

In recent years, a wide-angle, high-magnification zoom lens system comprising, in order from its object side, a first lens group having positive refracting power, a second lens group having negative refracting power, a third lens group having positive refracting power and a fourth lens group having positive refracting power, wherein the second, third and fourth lens groups are movable during zooming and focusing is carried out by the fourth lens group, has been proposed, as typically shown in JP-A 06-148520.

Another zoom lens system of the same type comprising, in order from its object side, a first lens group having positive refracting power, a second lens group having negative refracting power, a third lens group having positive refracting power and a fourth lens group having positive refracting power, wherein all the lens groups are movable during zooming, has been proposed as typically shown in JP-A 07-20381.

These zoom lens systems have simple lens arrangements, but they would have difficulty in application to future image pickup devices comprising an increasing number of pixels.

Rather, such zoom lens systems have been developed for use on cameras employing conventional silver-salt films. For instance, U.S. Pat. No. 4,299,454 discloses a zoom lens system having a field angle of 80° or greater at its wide-angle end and comprising, in order from its object side, a first lens group of positive refracting power, a second lens group of negative refracting power, a third lens group of positive refracting power and a fourth lens group of positive refracting power, wherein the respective lens groups are movable for zooming.

JP-B 58-33531 comes up with a zoom lens system having a zoom ratio of about 5 at a field angle of about 74° to about 19°. Comprising, in order from its object side, a first lens group of positive refracting power, a second lens group of negative refracting power, a third lens group of positive refracting power, a fourth lens group of negative refracting power and a fifth lens group of positive refracting power, this zoom lens system is characterized in that the first and second lens groups are integrated together for focusing.

U.S. Pat. No. 4,896,950 proposes a zoom lens system including a field angle of about 74° to about 8.3°. This zoom lens system comprises, in order from its object side, a first lens group of positive refracting power, a second lens group of negative refracting power, a third lens group of positive refracting power, a fourth lens group of negative refracting power and a fifth lens group of positive refracting power, with the first lens group remaining fixed during zooming.

These zoom lens systems offer no problem when used in silver-salt film camera applications; however, they cannot be used as such for the purpose of taking advantage of aperture efficiency including microlenses used with CCDs for future digital cameras. In consideration of color variation problems inclusive of chromatic aberrations, optical designs are still increasingly required, in which the angle of emergent chief off-axis rays is taken into full consideration possibly with field illuminance in mind.

The primary object of the present invention is to develop a wide-angle, high-magnification zoom lens system best suited for use on cameras, etc.

Some conventional video cameras have been proposed as wide-angle, high-magnification zoom lens systems. However, never until now is any optical system of optical performance well compatible with high-pixel image pickup devices proposed. Silver-salt camera-oriented optical systems leave much to be desired in conjunction with their optical performance and their compatibility with CDs.

In consideration of an image pickup device comprising a microlens, the influences of aliasing due to chromatic aberrations, etc., there is thus a growing demand for an optical system that is a sort of conventional video camera-oriented zoom lens system with some telecentric performance added thereto.

Used primarily with an imaging device having a relatively large image circle, the zoom lens system of the present invention increases extraordinarily in size when optically designed on the basis of a conventional video camera-oriented zoom lens system, often presenting a practically grave problem.

SUMMARY OF THE INVENTION

In view of such prior art states as mentioned above, an object of the present invention is to provide a compact zoom lens system which is applicable to a relatively large image-formation device, can maintain sufficient image-formation capabilities at a wide-angle end of greater than 70° and at a zoom ratio of greater than about 10, and has a proper focusing mode.

According to the present invention, this object is attainable by the provision of a zoom lens system comprising in order from an object side thereof, a first lens group having positive refracting power, a second lens group having negative refracting power, a third lens group having positive refracting power, a fourth lens group having negative refracting power and a fifth lens group having positive refracting power, wherein:

for zooming from a wide angle end to a telephoto end of said zoom lens system, said first lens group to said fifth lens group are all movable, during said zooming, said first lens group and said third lens group move toward said object side in such a way that a spacing between said first lens group and said second lens group becomes wide and a spacing between said third lens group and said fourth lens group becomes wide, at least said fourth lens group or said fifth lens group makes a non-linear movement, thereby compensating for a fluctuation of an image plane position with zooming, and focusing to an finite object is carried out by moving said first lens group and second lens group as an integral unit.

The present invention also provides a zoom lens system comprising in order from an object side thereof, a first lens group having positive refracting power, a second lens group having negative refracting power, a third lens group having positive refracting power, a fourth lens group having negative refracting power and a fifth lens group having positive refracting power, wherein:

for zooming from a wide angle end to a telephoto end of said zoom lens system, said first lens group to said fifth lens group are all movable, during said zooming, said first lens group and said third lens group move toward said object side in such a way that a spacing between said first lens group and said second lens group becomes wide and a spacing between said third lens group and said fourth lens group becomes wide, at least said fourth lens group or said fifth lens group makes a non-linear movement, thereby compensating for a fluctuation of an image plane position with zooming, and focusing to an finite object is carried out by moving second lens group.

Further, the present invention provides a zoom lens system comprising in order from an object side thereof, a first lens group having positive refracting power, a second lens group having negative refracting power, a third lens group having positive refracting power, a fourth lens group having negative refracting power and a fifth lens group having positive refracting power, wherein:

for zooming from a wide angle end to a telephoto end of said zoom lens system, said first lens group to said fifth lens group are all movable, during said zooming, said first lens group and said third lens group move toward said object side in such a way that a spacing between said first lens group and said second lens group becomes wide and a spacing between said third lens group and said fourth lens group becomes wide, at least said fourth lens group or said fifth lens group makes a non-linear movement, thereby compensating for a fluctuation of an image plane position with zooming, and focusing to an finite object is carried out by moving together said fourth lens group and said fifth lens group.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Figure 1A:
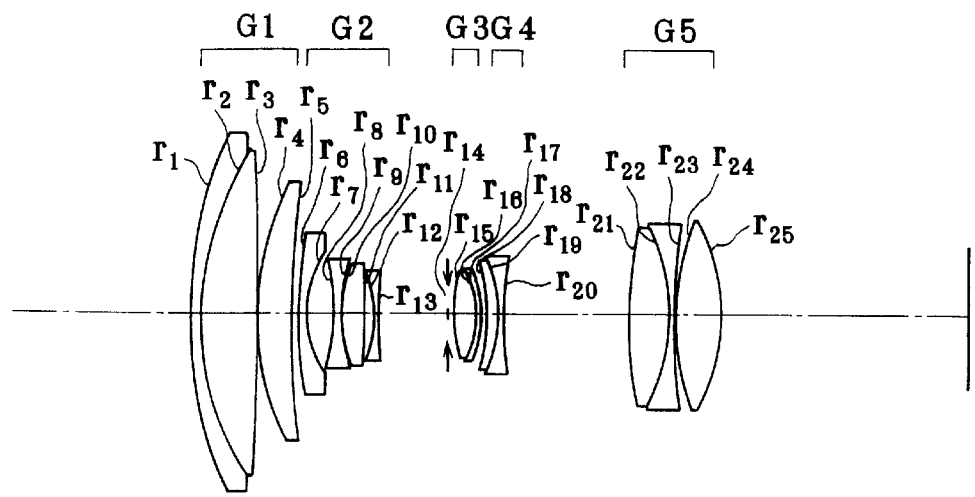
FIGS. 1(a), 1(b) and 1(c) show sectional lens arrangements at the wide angle end (a), intermediate settings (b) and telephoto end (c) when the zoom lens system of Example 1 according to the invention is focused at infinity.

First, why the aforesaid arrangements are used in the invention, and how they act is explained. Then, some examples of the zoom lens system of the invention will be given.

As mentioned above, the object of the present invention is to provide a compact yet high-performance, wide-angle, high-magnification zoom lens system having a proper focusing mode.

So far, zoom lens systems comprising, in order from their object side, a first lens group having positive refracting power, a second lens group having negative refracting power, a third lens group having positive refracting power and a fourth lens group having positive refracting power have been in vogue for silver-salt film cameras, and the design that the first to the fourth lens groups are all movable has become ordinary for high-magnification zoom lens systems. The movement of the third and fourth lens groups is necessary to make correction for fluctuations of field curvature with zooming and, in an extreme case, these groups may basically be thought of as one unit. To achieve an even wider-angle, higher-zoom ratio arrangement, however, it is advantageous in view of both correction of aberrations and zooming to use one movable negative lens group in addition to the positive lens group. Such a five-group arrangement is found to be very effective for a zoom lens system having a zoom ratio of about 10 or greater such as one contemplated herein. In general, as the number of lenses increases, it is increasingly required to make correction for chromatic aberrations at each lens group. This is considered to be the reason that the number of lenses increases. According to the present invention, however, it is possible to decrease the number of lenses by making effective use of aspherical surfaces. In other words, the aspherical surfaces are used in such a way as to correct distortions at the second lens group and make satisfactory correction for comae, etc. at the following lens groups.

Thus, the present invention provides a zoom lens system comprising in order from an object side thereof, a first lens group having positive refracting power, a second lens group having negative refracting power, a third lens group having positive refracting power, a fourth lens group having negative refracting power and a fifth lens group having positive refracting power, wherein:

for zooming from a wide angle end to a telephoto end of said zoom lens system, said first lens group to said fifth lens group are all movable, during said zooming, said first lens group and said third lens group move toward said object side in such a way that a spacing between said first lens group and said second lens group becomes wide and a spacing between said third lens group and said fourth lens group becomes wide, at least said fourth lens group or said fifth lens group makes a non-linear movement, thereby compensating for a fluctuation of an image plane position with zooming, and focusing to an finite object is carried out by moving said first lens group and second lens group as an integral unit.

This focusing mode of the invention wherein the first and second lens groups are moved as an integral unit is much more reduced in the amount of focusing movement as compared with the focusing mode wherein the first lens group is moved, and so makes it possible to reduce fluctuations of aberrations with focusing.

Set out below are the third aberration coefficients for Example 1, given later, at the telephoto end with respect to an object at a finite distance and an object at infinity.

| Object at infinity | | | | |
|---|---|---|---|---|
| Lens Group | SA3 | CM3 | AS3 | DT3 |
| G1 | −0.2030 | 0.8204 | −0.4540 | 0.8734 |
| G2 | 0.3183 | −0.0675 | 0.5544 | −0.5450 |
| G3 | −0.2642 | −0.9499 | −0.2787 | −0.0662 |
| G4 | 0.1130 | 0.2929 | 0.2996 | 0.7432 |
| G5 | −0.0011 | 0.0328 | −0.1332 | −0.7235 |
| Σ | −0.0370 | 0.1288 | −0.0119 | 0.2819 |

| Object at infinity | | | |
|---|---|---|---|
| Lens Group | PZ3 | PAC | PLC |
| G1 | −0.0659 | −0.0760 | 0.0824 |
| G2 | 0.3199 | 0.1176 | −0.05751 |
| G3 | −0.2059 | −0.0735 | −0.0028 |
| G4 | 0.1192 | 0.0202 | 0.0103 |
| G5 | −0.1748 | 0.0090 | 0.0091 |
| Σ | −0.0074 | −0.0109 | 0.0415 |

| 2.0 m | | | | |
|---|---|---|---|---|
| Lens Group | SA3 | CM3 | AS3 | DT3 |
| G1 | −0.0826 | 0.4477 | −0.3567 | 1.0524 |
| G2 | 0.1984 | 0.1718 | 0.4512 | −0.7711 |
| G3 | −0.2272 | −0.8589 | −0.2650 | −0.0662 |
| G4 | 0.0971 | 0.2649 | 0.2849 | 0.7432 |
| G5 | −0.0009 | 0.0297 | −0.1267 | −0.7235 |
| Σ | −0.0151 | 0.0552 | −0.0123 | 0.2347 |

| 2.0 m | | | |
|---|---|---|---|
| Lens Group | PZ3 | PAC | PLC |
| G1 | −0.0626 | −0.0486 | 0.0786 |
| G2 | 0.3042 | 0.0789 | −0.0588 |
| G3 | −0.1957 | −0.0699 | −0.0028 |
| G4 | 0.1133 | 0.0192 | 0.0103 |
| G5 | −0.1662 | 0.0086 | 0.0091 |
| Σ | −0.0070 | −0.0118 | 0.0363 |

In the above tables, SA3, CM3, AS3, DT3, PZ3, PAC, and PLC stand for spherical aberration coefficients, coma coefficients, astigmatism coefficients, distortion coefficients, field curvature coefficients, chromatic aberration-of-magnification coefficients, and longitudinal chromatic aberration coefficients, respectively.

From these aberration coefficients, it is found that the fluctuations of aberrations with focusing are as a whole considerably reduced. This focusing mode is more favorable than the focusing mode wherein the front or first lens group is moved.

The zoom lens system according to the first aspect of the invention should preferably satisfy the following conditions:

$$2.0 < f_1/f_W < 8.0 \quad (1)$$

$$0.4 < |f_2/f_W| < 1.0 \quad (2)$$

$$0.3 < f_3/f_{T345} < 1.2 \quad (3)$$

$$0.6 < |f_4|/f_{T345} < 5.0 \quad (4)$$

$$0.5 < f_5/f_{T345} < 4.0 \quad (5)$$

Here, $f_W$ is the focal length of the zoom lens system at the wide angle end,
$f_1$ is the focal length of the first lens group,
$f_2$ is the focal length of the second lens group,
$f_3$ is the focal length of the third lens group,
$f_4$ is the focal length of the fourth lens group,
$f_5$ is the focal length of the fifth lens group, and
$f_{T345}$ is the focal length of the third to fifth lens groups at the telephoto end.

The primary object of the present invention is to provide a zoom lens optical system that can well accommodate to about 70° or greater at the wide-angle end and have high image-formation capabilities. According to the invention, this object is attained by the provision of a zoom lens system comprising, in order from its object side, a first lens group of positive refracting power, a second lens group of negative refracting power, a third lens group of positive refracting power, a fourth lens group of negative refracting power and a fifth lens group of positive lens group and having a proper power profile conforming to the aforesaid conditions (1) to (5), thereby achieving an actually optimum lens arrangement. In addition, size increases and performance decreases often experienced with wide-angle, high-magnification zoom lenses are avoidable.

Condition (1) is provided to define the power profile of the first lens group. For the first lens group it is important to maintain its image-formation capabilities while care should be taken of increases in the amount of its movement and the diameter of its front lens, because this lens group is designed to move during zooming when used for the present invention.

Exceeding the upper limit of 8.0 to condition (1) may be favorable for correction of aberrations because of a decrease in the amount of residual aberrations. However, this is not preferable because the amount of zooming movement of the first lens group increases with an increasing diameter of lenses, resulting in an increase in the whole size of the zoom lens system. Falling short of the lower limit of 2.0 may be favorable for the purpose of size reductions because the diameter of the front lens becomes small with a decrease in the amount of its zooming movement. However, this is not preferred for correction of aberrations.

Condition (2) is provided to determine the power profile of the second lens group of negative refracting power. The second lens group has some relation to the determination of the power of the first lens group. In other words, when the power of the second lens group is small, it is required to make the power of the first lens group small; the zoom lens system tends to increase in size.

Exceeding the upper limit of 1.0 to condition (2) may be favorable for a lens arrangement (the number of lenses used decreases) and correction of aberrations. However, this is not preferable because of many other problems such as an increase in the front lens in the first lens group and an increase in the amount of zooming movement of the second lens group. When the lower limit of 0.4 is not reached, on the other hand, it is possible to decrease the diameter of lenses. However, this offers correction-of-aberration problems; distortions and off-axis comae become noticeable. If the second lens group conforms to condition (2), decreased lens diameter and enhanced image-formation capabilities are then achievable by use of a proper lens arrangement.

Condition (3) is provided to determine the power of the third lens group. In the zoom lens system of the present invention, the third, fourth and fifth lens groups define together an image-formation unit. In view of zooming, these lens groups may be thought of as independent lens groups. The zoom lens system of the invention is different from many conventional zoom lens systems wherein the third lens group has positive refracting power and the fourth lens group has positive refracting power. In the invention, the third lens group acts to converge light beams from the second lens group having strong diverging power, thereby making correction for spherical aberrations and off-axis aberrations. The third lens group also acts to make satisfactory correction for longitudinal spherical aberration.

Exceeding the upper limit of 1.2 to condition (3) is very favorable to correct the third lens group for aberrations. However, this is not preferred because of an increase in the amount of zooming movement of the third lens group. Falling short of the lower limit of 0.3 may be desirous for size reductions because of a decrease in the amount of zooming movement of the third lens group. In view of correction of aberrations, however, this is not preferred because of difficulty in correction of not only spherical aberrations but also off-axis comae.

Condition 4 is provided for the fourth lens group that is different in performance from each lens group in the aforesaid four-group zoom lens system comprising, in order from its object side, a first lens group of positive refracting power, a second lens group of negative refracting power, a third lens group of positive refracting power and a fourth lens group of positive refracting power. Condition (4) is provided to determine the power of the fourth lens group having negative refracting power. When the upper limit of 5.0 to condition (4) is exceeded, it is difficult to make the zoom ratio of the zoom lens system high, because of an increase in the amount of movement of the fourth lens group between the third and the fifth lens group. Falling short of the lower limit of 0.6 is not desired for the purpose of correction of aberrations although the amount of zooming movement of the fourth lens group decreases. In the present invention, light beams close to afocal ones are obtained at the first to fourth lens groups and in the vicinity of the wide-angle end in particular.

Condition (5) is provided to determine the power of the fifth lens group. This lens group takes an important role in control of a principal ray in off-axis light beams. Especially when the zoom lens system of the present invention is used with an image pickup device like a CCD, the fifth lens group takes a great role in making an off-axis principal ray telecentric to some extent. Exceeding the upper limit of 4.0 to this condition is not preferred because of an increase in the amount of zooming movement of the fifth lens group, although the fifth lens group is easily corrected for aberrations. When the lower limit of 0.5 is not reached, correction of off-axis aberrations becomes difficult and, at the same time, it is difficult to make correction for aberrations with no increase in the number of lenses. If this group is constructed of an increased number of lenses, any desired result is then not obtained because the whole size of the zoom lens system becomes large.

Another object of the present invention is to make the possible simplest lens arrangement for the zoom lens system, thereby achieving significant size reductions. In this case, the refracting power profile between adjacent lens groups is important for not only the lens arrangement of each group but also the amount of zooming movement of each lens group.

Yet another object of the present invention is to provide a zoom lens system which includes a wide-angle end of about 70° or greater albeit having a high magnification, and is simpler in construction and higher in performance than prior zoom lens systems.

In terms of focal length, the focal length of the optical system at its wide-angle end should preferably be shorter than the effective diagonal length of the image-formation plane of the optical system or the image pickup device.

A further object of the present invention is to provide an optical system which, as described in the examples given later, can keep telecentric performance to some extent, albeit having a longer effective diagonal length than before. This feature of the invention is to solve aliasing, shading or other color problems occurring on the image-formation plane of an image pickup device, e.g., a CCD.

To be more specific, a chief ray emanating from the optical system should preferably be determined on the basis of the following condition:

$$10 < |Expd_W \times Y|/L_W \tag{6}$$

Here $Expd_W$ is an optical axis distance from the image-formation plane position to an exit pupil, Y is an actual maximum image height at the image-formation plane, and $L_W$ is an optical axis distance from the apex of a surface located nearest to the object side in the first lens group, as measured at the wide-angle end, to the image-formation plane.

By satisfying this condition, it is possible to satisfy the requirement for enabling clear images to be obtained.

The zoom lens system of the present invention should further satisfy the following conditions for zooming from the wide-angle end to the telephoto end:

$$1.6 < \Delta_{1T}/f_W < 5.0 \tag{7}$$

$$0.4 < \Delta_{3T}/f_W < 4.0 \tag{8}$$

Here $\Delta_{1T}$ is the amount of zooming movement of the first lens group to the telephoto end as measured on a wide-angle end basis, and $\Delta_{3T}$ is the amount of zooming movement of the third lens group to the telephoto end as measured on a wide-angle end basis.

Condition (7) is provided to define the amount of zooming movement of the first lens group from the wide-angle end to the telephoto end, and condition (8) is provided to define the amount of zooming movement of the third lens group from the wide-angle end to the telephoto end.

According to condition (7), the amount of zooming movement of the first lens group is properly determined so that size reductions are achievable. Exceeding the upper limit of 5.0 to condition (7) makes it difficult to reduce the whole size of the zoom lens system inclusive of a barrel structure because of an increase in the amount of movement of the first lens group to the telephoto end, although the overall length of the system at the wide-angle end is relatively reduced. Falling short of the lower limit of 1.6 is not desired because of a failure in allowing the first lens group to have a sufficient amount of zooming movement and, hence, in allowing the zoom lens system to have a high zoom ratio.

Exceeding the upper limit of 4.0 to condition (8) is not desired because of an increase in the amount of movement of the third lens group and, hence, an increase in the whole size of the zoom lens system. A zoom lens system that does not satisfy the lower limit of 0.4 may be achieved without recourse to the zooming mode of the present invention.

The image-formation magnification is now explained. The zoom lens system of the present invention is characterized in that the five lens groups are all designed to move for zooming. Upon movevment from the wide-angle end to the telephoto end, the second lens group has a large zooming action, as can be seen from the following condition (9).

The second lens group itself may remain fixed during zooming.

That is, the second lens group should preferably have a paraxial transverse magnification conforming to:

$$2.5 < \beta_{2T}/\beta_{2W} < 7 \qquad (9)$$

Here $\beta_{2W}$ is the image-formation magnification of the second lens group at the wide-angle end, and $\beta_{2T}$ is the image-formation magnification of the second lens group at the telephoto end.

It is here noted that the third lens group should preferably consist of one positive lens.

According to the second aspect of the present invention, there is provided a zoom lens system comprising in order from an object side thereof, a first lens group having positive refracting power, a second lens group having negative refracting power, a third lens group having positive refracting power, a fourth lens group having negative refracting power and a fifth lens group having positive refracting power, wherein:

for zooming from a wide angle end to a telephoto end of said zoom lens system, said first lens group to said fifth lens group are all movable, during said zooming, said first lens group and said third lens group move toward said object side in such a way that a spacing between said first lens group and said second lens group becomes wide and a spacing between said third lens group and said fourth lens group becomes wide, at least said fourth lens group or said fifth lens group makes a non-linear movement, thereby compensating for a fluctuation of an image plane position with zooming, and focusing to an finite object is carried out by moving second lens group.

In the zoom lens system according to this aspect, the second lens group is moved to perform inner focusing while the length of the zoom lens system is kept constant, so that fluctuations of aberrations with focusing can be reduced while the amount of movement of the respective lens groups is generally reduced.

Set out below are the third aberration coefficients for Example 2, given later, at the telephoto end with respect to an object at a finite distance and an object at infinity.

| Object at infinity | | | | |
|---|---|---|---|---|
| Lens Group | SA3 | CM3 | AS3 | DT3 |
| G1 | −0.2028 | 0.8611 | −0.4919 | 0.9499 |
| G2 | 0.3103 | −0.0585 | 0.5941 | −0.5560 |
| G3 | −0.2387 | −0.8738 | −0.2973 | −0.0702 |
| G4 | 0.0906 | 0.1448 | 0.2188 | 0.8177 |
| G5 | −0.0090 | 0.10545 | −0.0476 | −0.7586 |
| Σ | −0.0496 | 0.1791 | −0.0239 | 0.3768 |

| -continued | | | |
|---|---|---|---|
| Object at infinity | | | |
| Lens Group | PZ3 | PAC | PLC |
| G1 | −0.0677 | −0.0756 | 0.0792 |
| G2 | 0.3395 | 0.1013 | −0.0514 |
| G3 | −0.2233 | −0.0577 | −0.0017 |
| G4 | 0.1267 | 0.0234 | 0.0172 |
| G5 | −0.1826 | −0.001 | −0.0050 |
| Σ | −0.0074 | −0.0096 | 0.0383 |

| 2.0 m | | | |
|---|---|---|---|
| Lens Group | SA3 | CM3 | AS3 | DT3 |
| G1 | −0.0249 | 0.2017 | −0.2781 | 1.3523 |
| G2 | 0.1807 | 0.3988 | 0.3913 | −1.0653 |
| G3 | −0.2367 | −0.8690 | −0.2965 | −0.0702 |
| G4 | 0.0899 | 0.1440 | 0.2182 | 0.8117 |
| G5 | −0.0089 | 0.1049 | −0.0475 | −0.7586 |
| Σ | 0.0001 | −0.0196 | −0.0126 | 0.2670 |

| 2.0 m | | | |
|---|---|---|---|
| Lens Group | PZ3 | PAC | PLC |
| G1 | −0.0675 | −0.0263 | 0.0550 |
| G2 | 0.3385 | 0.0562 | −0.0481 |
| G3 | −0.2227 | −0.0576 | −0.0017 |
| G4 | 0.1264 | 0.0233 | 0.0172 |
| G5 | −0.1821 | −0.0010 | 0.0050 |
| Σ | −0.0074 | −0.0053 | 0.0174 |

From these aberration coefficients, it is found that the fluctuations of aberrations with focusing are as a whole considerably reduced. This can also be ascertained by actual aberrations.

According to the third aspect of the present invention, there is provided a zoom lens system comprising in order from an object side thereof, a first lens group having positive refracting power, a second lens group having negative refracting power, a third lens group having positive refracting power, a fourth lens group having negative refracting power and a fifth lens group having positive refracting power, wherein:

for zooming from a wide angle end to a telephoto end of said zoom lens system, said first lens group to said fifth lens group are all movable, during said zooming, said first lens group and said third lens group move toward said object side in such a way that a spacing between said first lens group and said second lens group becomes wide and a spacing between said third lens group and said fourth lens group becomes wide, at least said fourth lens group or said fifth lens group makes a non-linear movement, thereby compensating for a fluctuation of an image plane position with zooming, and focusing to an finite object is carried out by moving together said fourth lens group and said fifth lens group.

In the zoom lens system according to this aspect, the fourth and fifth lens groups are moved to perform inner focusing while the length of the zoom lens system is kept constant, so that fluctuations of aberrations with focusing can be reduced.

Set out below are the third aberration coefficients for Example 3, given later, at the telephoto end with respect to an object at a finite distance and an object at infinity.

| | Object at infinity | | | |
|---|---|---|---|---|
| Lens Group | SA3 | CM3 | AS3 | DT3 |
| G1 | −0.2186 | 0.8905 | −0.4874 | 0.9161 |
| G2 | 0.2309 | −0.5432 | 0.5456 | −0.5751 |
| G3 | −0.0153 | −0.4484 | −0.2290 | −0.0727 |
| G4 | 0.0280 | −0.0079 | 0.0679 | 0.7021 |
| G5 | −0.0123 | 0.0721 | 0.0621 | −0.6222 |
| Σ | 0.0127 | −0.0369 | −0.0417 | 0.3482 |

| | Object at infinity | | |
|---|---|---|---|
| Lens Group | PZ3 | PAC | PLC |
| G1 | −0.0668 | −0.0834 | 0.0902 |
| G2 | 0.2904 | 0.1366 | −0.0790 |
| G3 | −0.1812 | −0.1124 | −0.0075 |
| G4 | 0.0934 | −0.0089 | −0.0253 |
| G5 | −0.1575 | 0.1649 | 0.0514 |
| Σ | −0.0217 | 0.0968 | 0.0298 |

| | 2.0 m | | | |
|---|---|---|---|---|
| Lens Group | SA3 | CM3 | AS3 | DT3 |
| G1 | −0.0949 | 0.4833 | −0.4495 | 0.9926 |
| G2 | 0.1235 | −0.1485 | 0.45856 | −0.6481 |
| G3 | −0.0446 | −0.4972 | −0.2312 | −0.0855 |
| G4 | 0.0317 | 0.0633 | 0.1673 | 0.6338 |
| G5 | −0.0057 | 0.0771 | −0.0389 | −0.6774 |
| Σ | −0.01 | −0.022 | −0.0937 | 0.2154 |

| | 2.0 m | | |
|---|---|---|---|
| Lens Group | PZ3 | PAC | PLC |
| G1 | −0.0648 | −0.055 | 0.0812 |
| G2 | 0.2818 | 0.1000 | −0.0732 |
| G3 | −0.1758 | −0.0934 | −0.0070 |
| G4 | 0.0906 | −0.0150 | −0.0246 |
| G5 | −0.1529 | 0.0411 | 0.0514 |
| Σ | −0.0211 | −0.0223 | 0.0278 |

From these aberration coefficients, it is found that the fluctuations of aberrations with focusing are as a whole considerably reduced. In actual applications, the amount of focusing movement at the telephoto end increases as the object distance becomes short. When it is intended to focus the zoom lens system on a nearby object, the fourth lens group and the fifth lens group should preferably be independently moved, thereby achieving very high image-formation capabilities.

In the zoom lens systems according to the second and third aspects of the present invention, too, it is desired that conditions (1) to (9) be satisfied and the third lens group be made up of one positive lens, as in the case of the zoom lens system according to the first aspect of the invention.

Figure 1B:
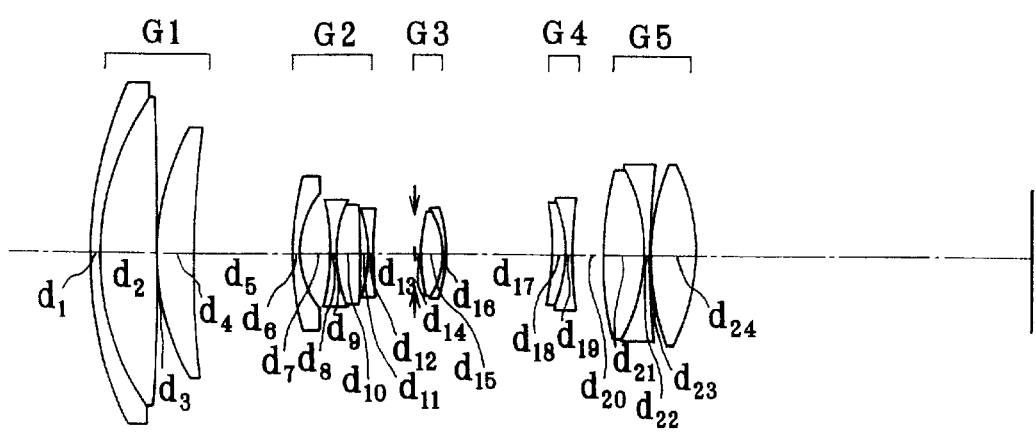
Figure 1C:
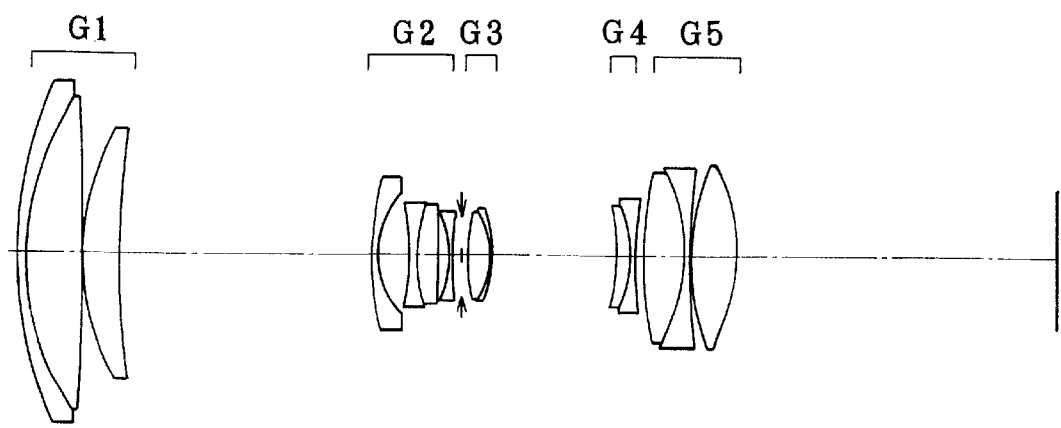
Figure 2A:
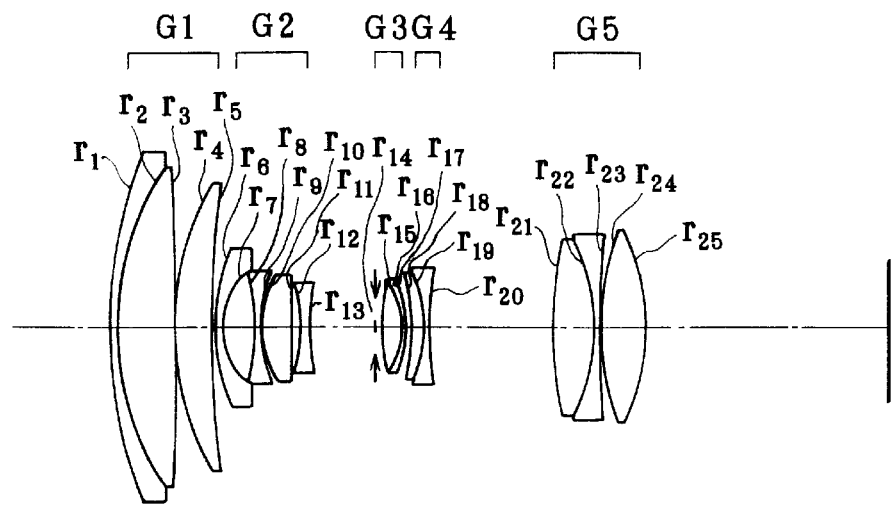
FIGS. 2(a), 2(b) and 2(c) are similar views of the zoom lens system of Example 2 of the invention, as in FIGS. 1(a), 1(b) and 1(c).
Figure 2B:
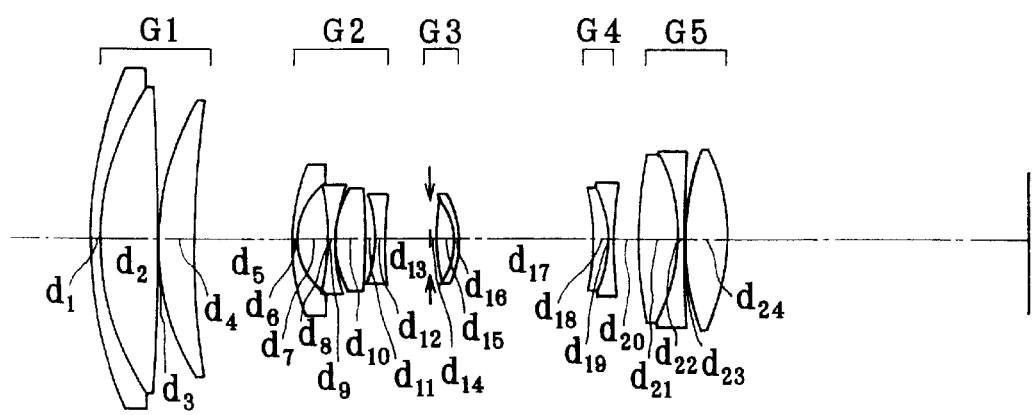
Figure 2C:
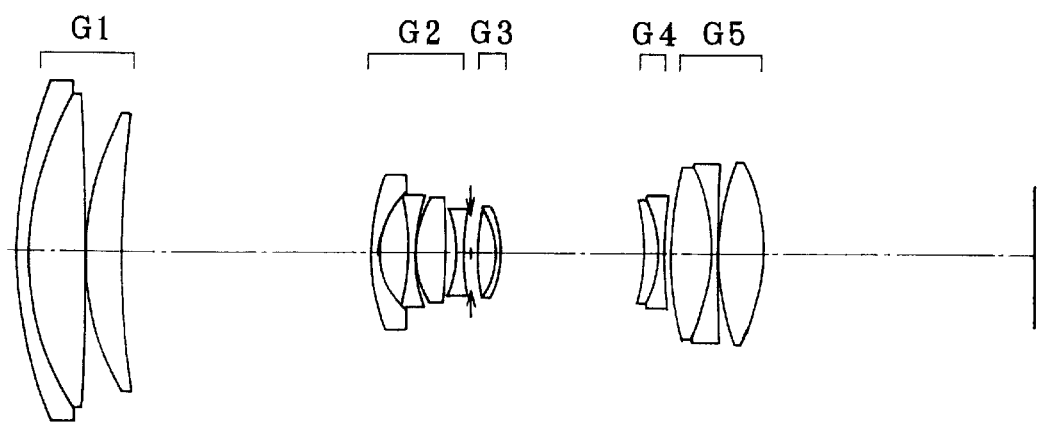
Figure 3A:
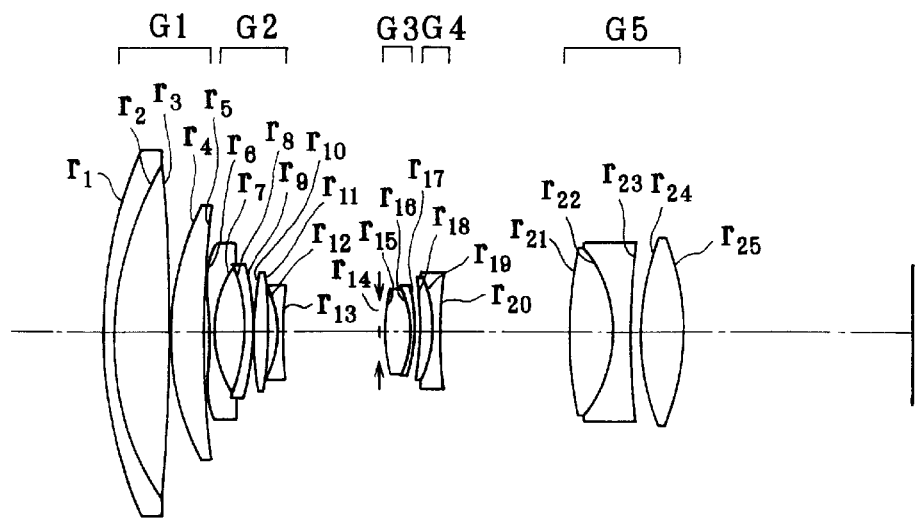
FIGS. 3(a), 3(b) and 3(c) are similar views of the zoom lens system of Example 3 of the invention, as in FIGS. 1(a), 1(b) and 1(c).
Figure 3B:
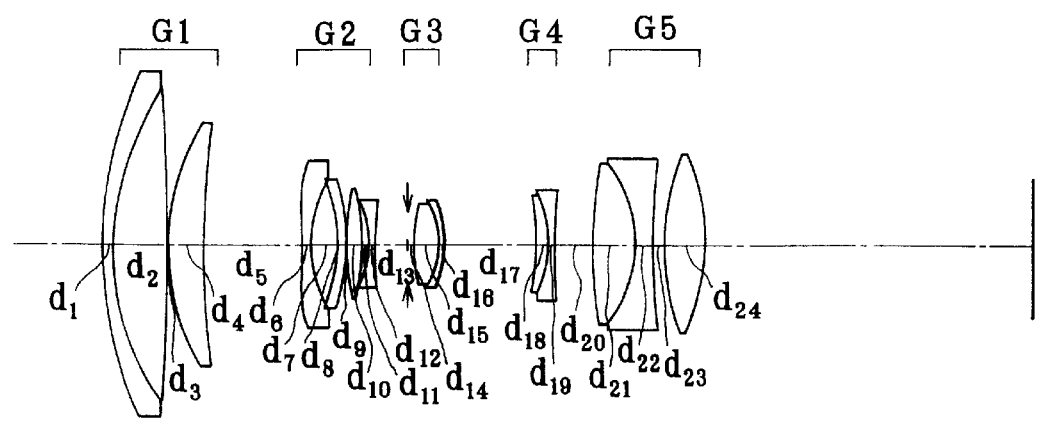
Figure 3C:
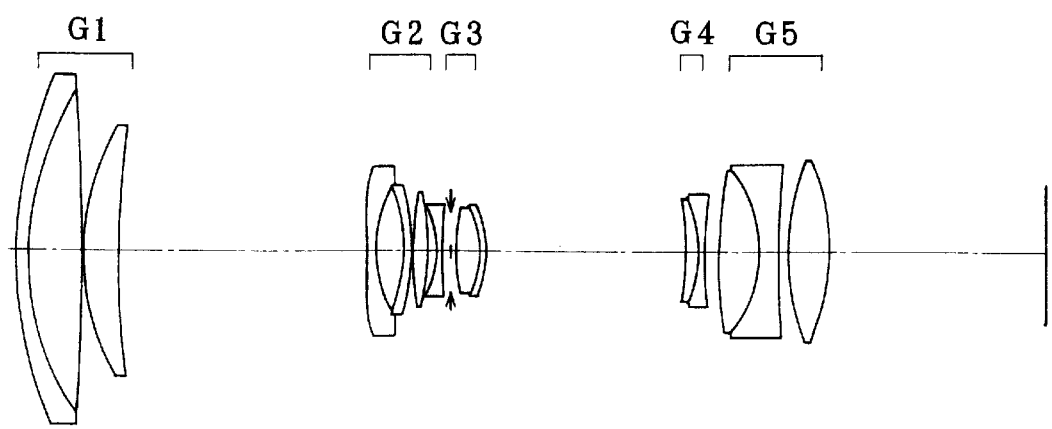

The zoom lens systems of the present invention are now explained with reference to Examples 1 to 3. Sectional lens arrangements of Examples 1 to 3 at the wide-angle end (a), intermediate settings (b) and telephoto end (c) upon focused at infinity are shown in FIGS. 1 to 3. Numerical data on each example will be set out later.

EXAMPLE 1

Example 1 is directed to a wide-angle, high-magnification zoom lens system having a focal length of 14.37 to 139.4 mm and an F-number of 3.5 to 4.48. For zooming from the wide-angle end to the telephoto end, as shown in FIG. 1, the first lens group G1 moves to the object side and the second lens group G2, third lens group G3, fourth lens group G4 and fifth lens group G5 move non-linearly in such a way that the spacing between the first lens group G1 and the second lens group G2 and the spacing between the third lens group G3 and the fourth lens group G4 become wide.

The first lens group G1 is made up of a doublet consisting of a negative meniscus lens having a strong curvature on its image side and a double-convex lens having a strong curvature on its object side and a positive meniscus lens having a strong curvature on its object side. The second lens group G2 is made up of a negative meniscus lens having a strong curvature on its image side, a double-concave lens, a double-convex lens and a double-concave lens. The third lens group G3 includes an aperture stop S, and is made up of a doublet located subsequent to the aperture stop S, said doublet consisting of a double-convex lens and a negative meniscus lens having a strong curvature on its object side. The fourth lens group G4 is made up of a doublet consisting of a positive meniscus lens having a strong curvature on its image side and a double-concave lens. The fifth lens group G5 is made up of a doublet consisting of a double-convex lens and a double-concave lens and a double-convex lens.

Five aspheric surfaces are used, one for the first surface of the first lens in the second lens group G2, one for the object-side surface of the second lens in the second lens group G2, one for the object-side surface of the double-convex lens in the third lens group G3, and two for both surfaces of the double-convex lens located nearest to the image side in the fifth lens group G5.

In this example, focusing is performed by moving the first lens group G1 and the second lens group G2 as an integral unit. With this focusing mode, it is possible to achieve extremely stabilized image-formation performance even at a finite object. The amount of focusing movement up to 2 mm is 2.24 mm; even focusing from infinity at the telephoto end to 2.0 m can be carried out with extremely stabilized performance.

Figure 4A:
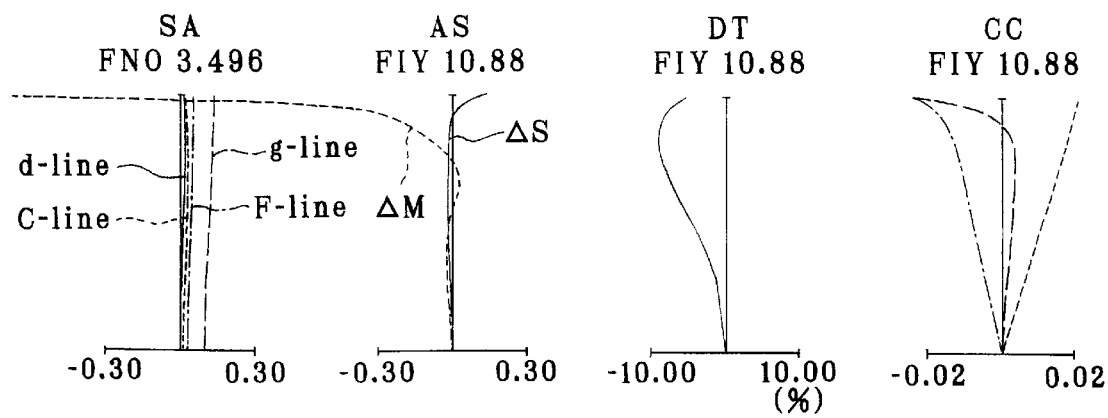
FIGS. 4(a), 4(b) and 4(c) are aberration diagrams for Example 1 upon focusing at infinity.
Figure 4B:
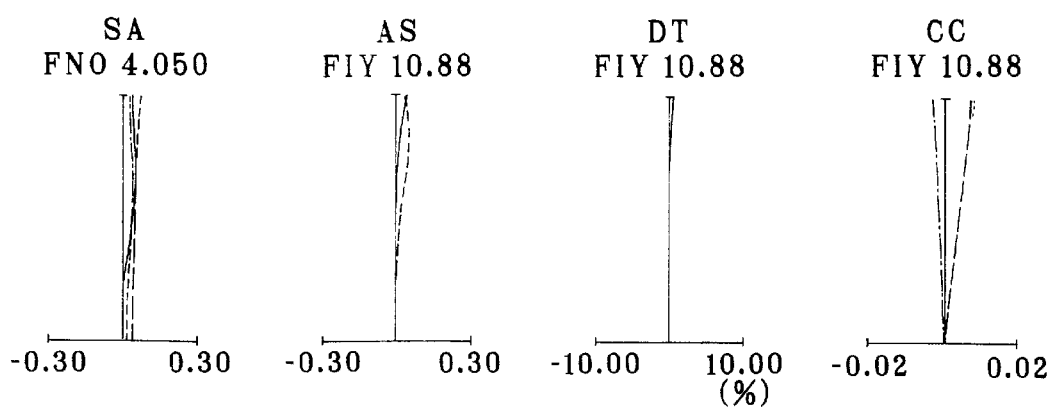
Figure 4C:
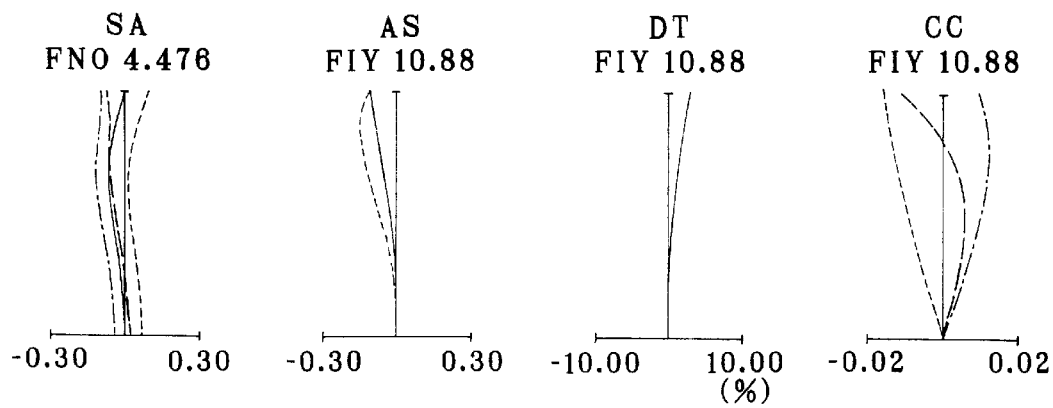
Figure 5A:
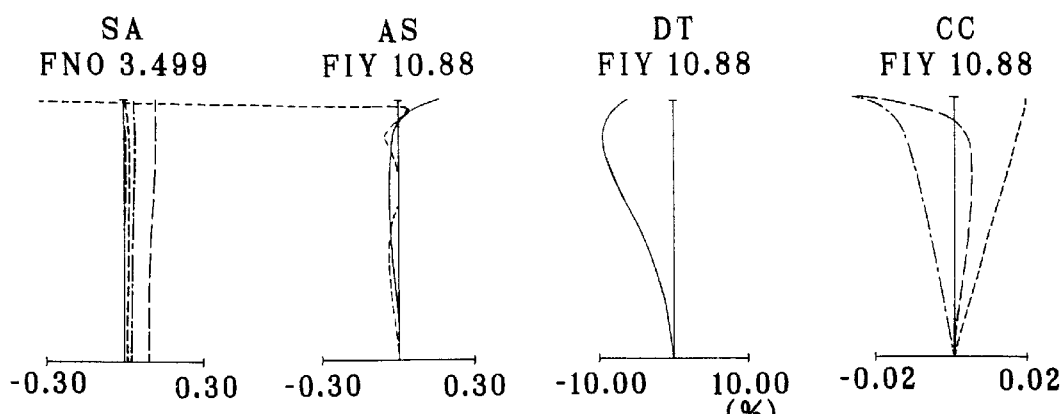
FIGS. 5(a), 5(b) and 5(c) are aberration diagrams for Example 1 upon focusing on an finite object (2.0 m).
Figure 5B:
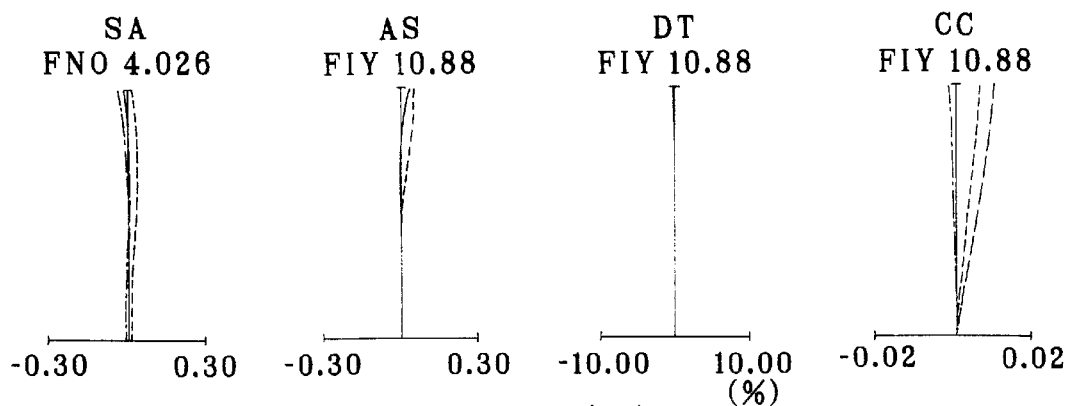
Figure 5C:
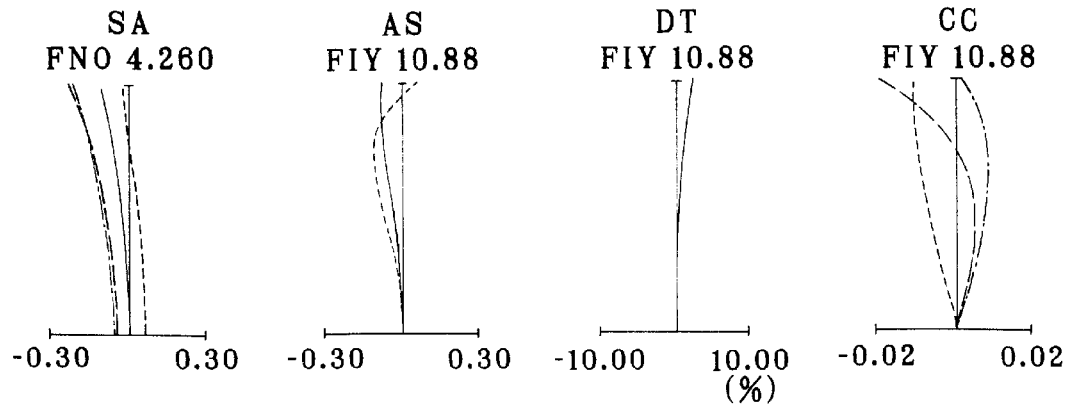

Aberration diagrams for this example upon focused at infinity are shown in FIGS. 4(*a*), 4(*b*) and 4(*c*), and those upon focused to 2 m are shown in FIGS. 5(*a*), 5(*b*) and 5(*c*). In these aberration diagrams, (a), (b) and (c) represent spherical aberrations SA, astigmatisms AS, distortions DT and chromatic aberrations of magnification CC at the wide-angle end, intermediate settings and telephoto end, and "FIY" stands for an image height, as will apply hereinafter.

EXAMPLE 2

Example 2 is directed to a wide-angle, high-magnification zoom lens system having a focal length of 14.38 to 139.39 mm and an F-number of 3.57 to 4.26. For zooming from the wide-angle end to the telephoto end, as shown in FIG. 2, the first lens group G1 moves to the object side and the second lens group G2, third lens group G3, fourth lens group G4 and fifth lens group G5 move non-linearly in such a way that the spacing between the first lens group G1 and the second lens group G2 and the spacing between the third lens group G3 and the fourth lens group G4 become wide.

The lens arrangement of each lens group and where aspherical surfaces are used are the same as in Example 1.

In this example, focusing is carried out by the movement of the second lens group G2. The amount of focusing movement from infinity at the telephoto end to 2.0 m is 4.76 mm.

Figure 6A:
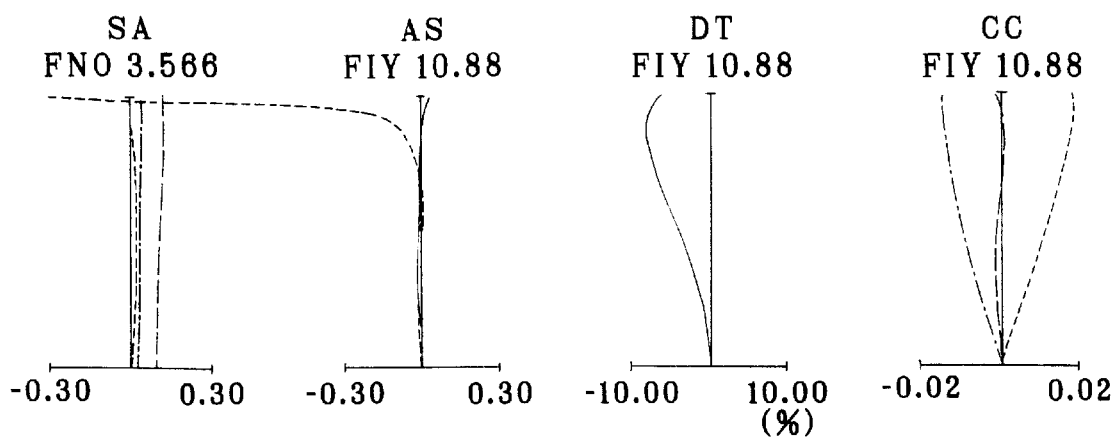
FIGS. 6(a), 6(b) and 6(c) are aberration diagrams for Example 2 upon focusing at infinity.
Figure 6B:
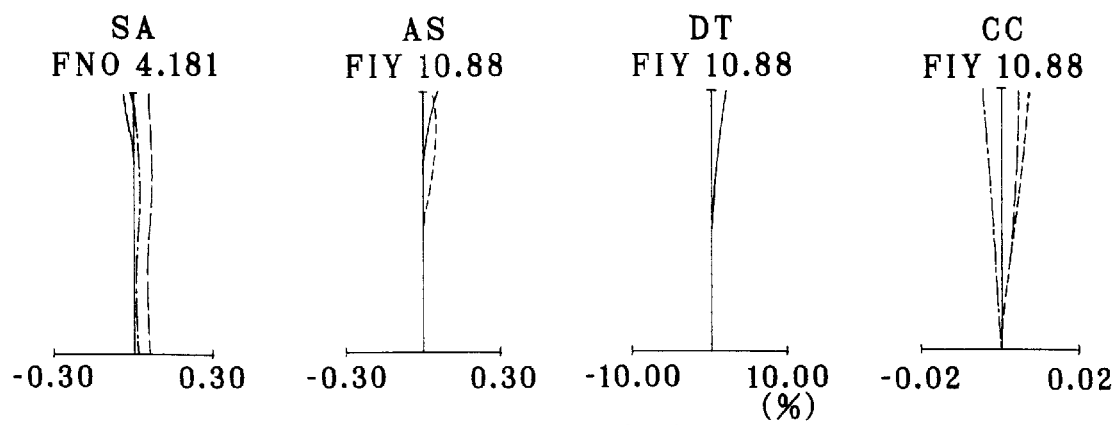
Figure 6C:
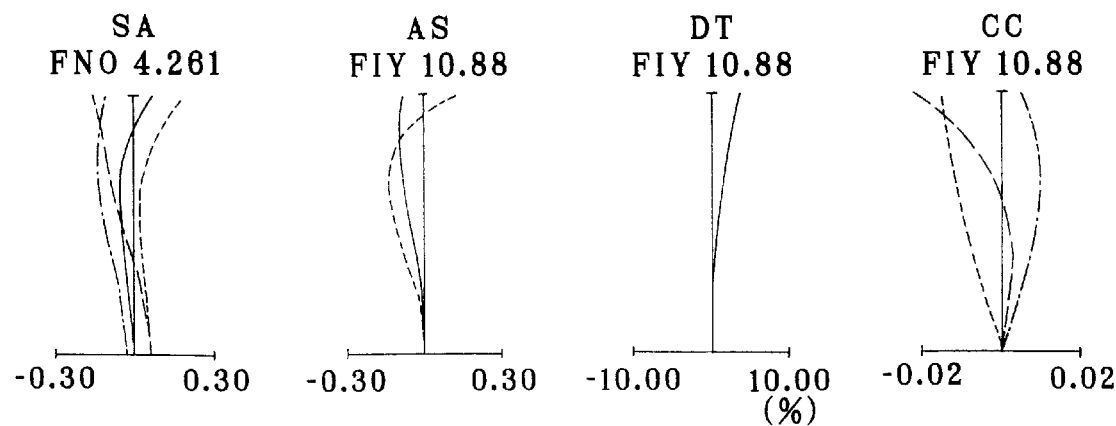
Figure 7A:
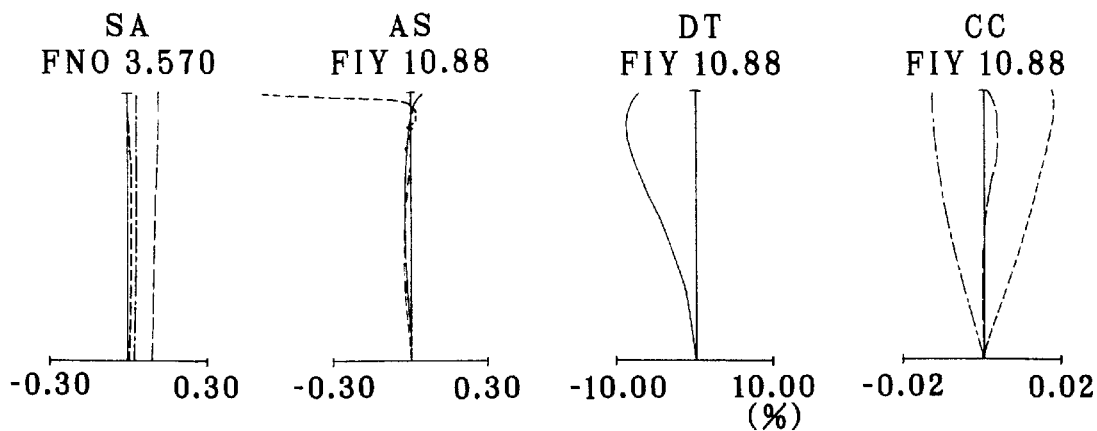
FIGS. 7(a), 7(b) and 7(c) are aberration diagrams for Example 2 upon focusing on an finite object (2.0 m).
Figure 7B:
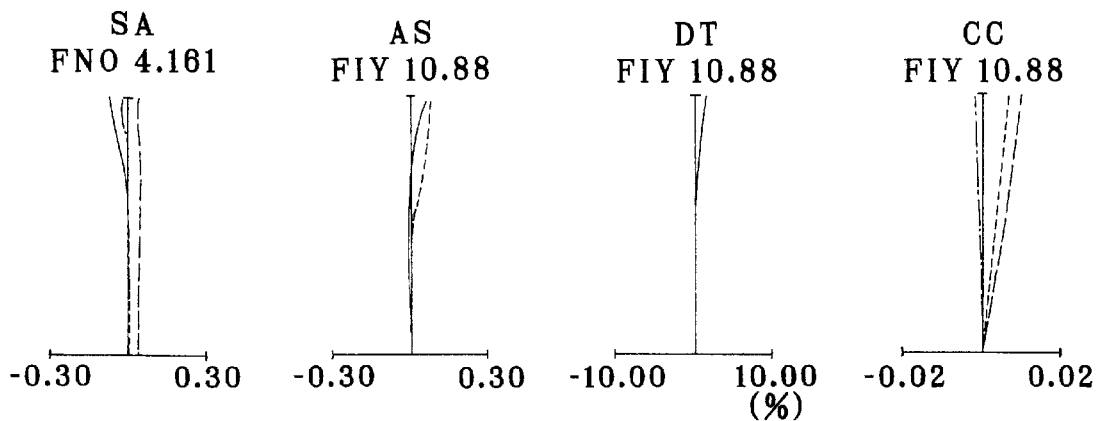
Figure 7C:
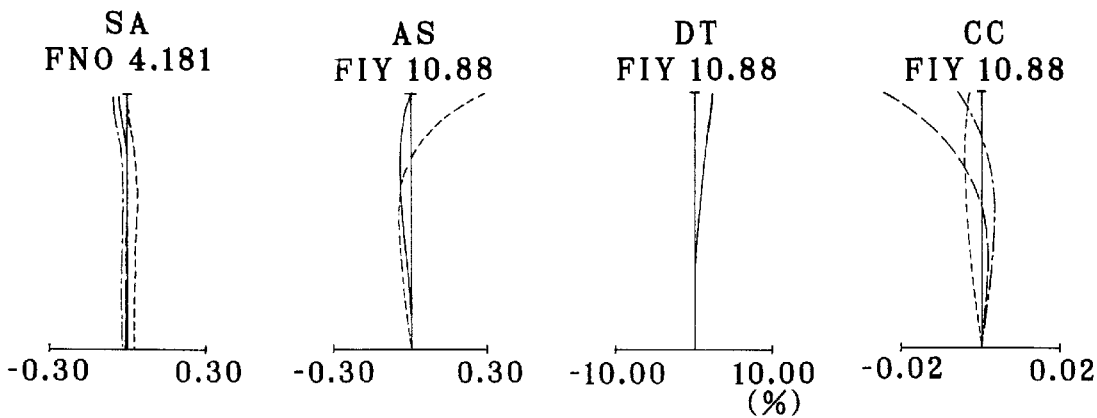

Aberration diagrams for this example upon focused at infinity are shown in FIGS. 6(*a*), 6(*b*) and 6(*c*), and those upon focused to 2 m are shown in FIGS. 7(*a*), 7(*b*) and 7(*c*).

EXAMPLE 3

Example 3 is directed to a wide-angle, high-magnification zoom lens system having a focal length of 14.36 to 139.5 mm and an F-number of 3.54 to 4.52. For zooming from the wide-angle end to the telephoto end, as shown in FIG. 3, the first lens group G1 moves to the object side and the second lens group G2, third lens group G3, fourth lens group G4 and fifth lens group G5 move non-linearly in such a way that the spacing between the first lens group G1 and the second lens group G2 and the spacing between the third lens group G3 and the fourth lens group G4 become wide.

The first lens group G1 is made up of a doublet consisting of a negative meniscus lens having a strong curvature on its image side and a double-convex lens having a strong curvature on its object side and a positive meniscus lens having a strong curvature on its object side. The second lens group G2 is made up of a negative meniscus lens having a strong curvature on its image side, a negative meniscus lens having a strong curvature on its object side, a double-convex lens and a negative meniscus lens having a strong curvature on its object side. The third lens group G3 includes an aperture stop S, and is made up of a doublet located subsequent to the aperture stop S, said doublet consisting of a double-convex lens and a negative meniscus lens having a strong curvature on its object side. The fourth lens group G4 is made up of a doublet consisting of a positive meniscus lens having a strong curvature on its image side and a double-concave lens. The fifth lens group G5 is made up of a doublet consisting of a double-convex lens and a double-concave lens and a double-convex lens.

Five aspherical surfaces are used, one for the first surface of the first lens in the second lens group G2, one for the object-side surface of the second lens in the second lens group G2, one for the object-side surface of the double-convex lens in the third lens group G3, and two for both surfaces of the double-convex lens located nearest to the image side in the fifth lens group G5.

In this example, focusing is carried out by moving the first lens group G4 and fifth lens group G5 as an integral unit. The amount of focusing movement from infinity to 2.0 m is larger than in Examples 1 and 2 or 11.52 mm.

As already explained, focusing may be carried out by use of one lens group, for instance, the third lens group G3, the fourth lens group G4 or the fifth lens group G5. To make sufficient correction for fluctuations of aberrations with focusing, a focusing mode using a plurality of movable lens groups is often needed.

Figure 8A:
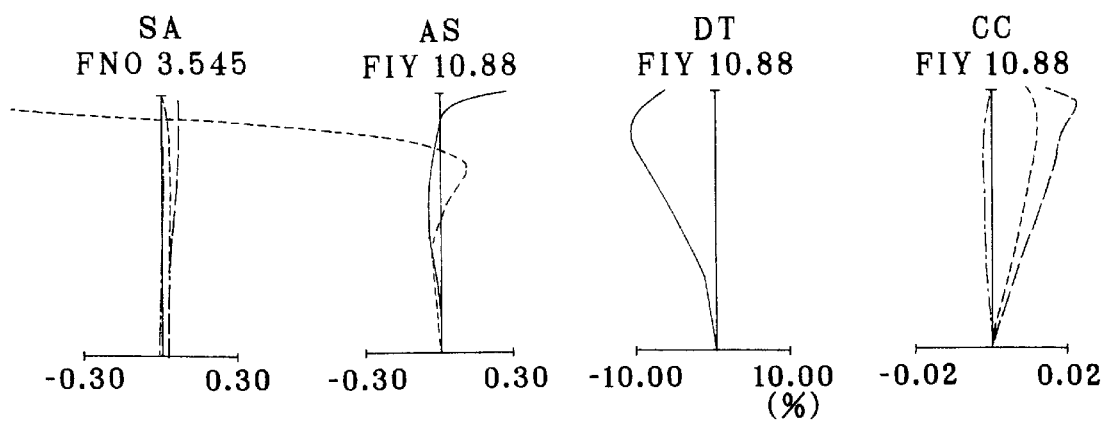
FIGS. 8(a), 8(b) and 8(c) are aberration diagrams for Example 3 upon focusing at infinity.
Figure 8B:
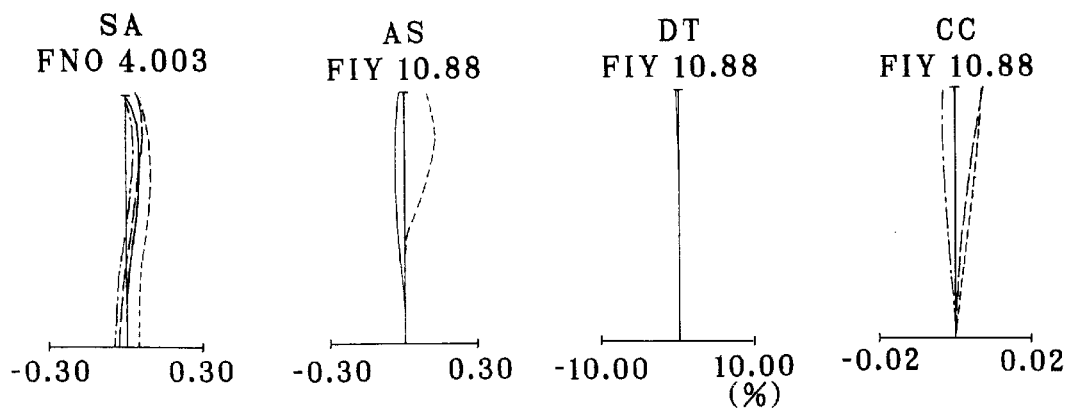
Figure 8C:
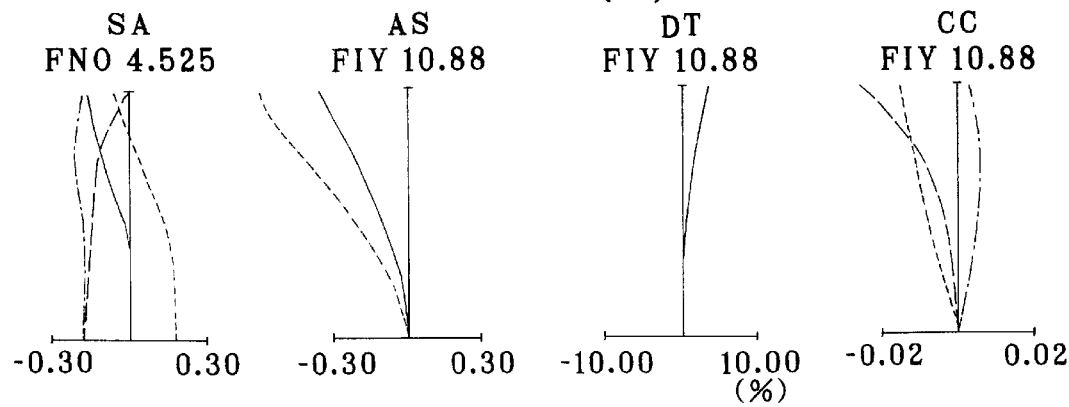
Figure 9A:
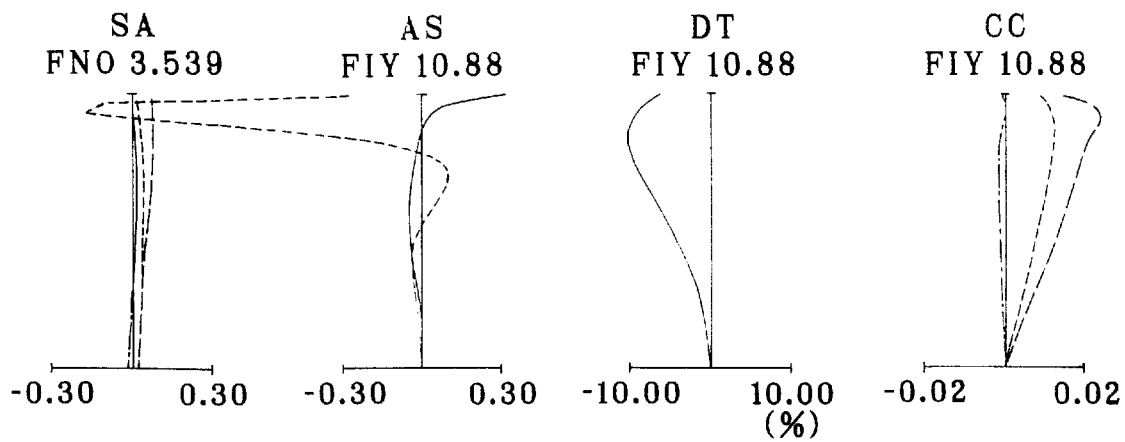
FIGS. 9(a), 9(b) and 9(c) are aberration diagrams for Example 3 upon focusing on an finite object (2.0 m).
Figure 9B:
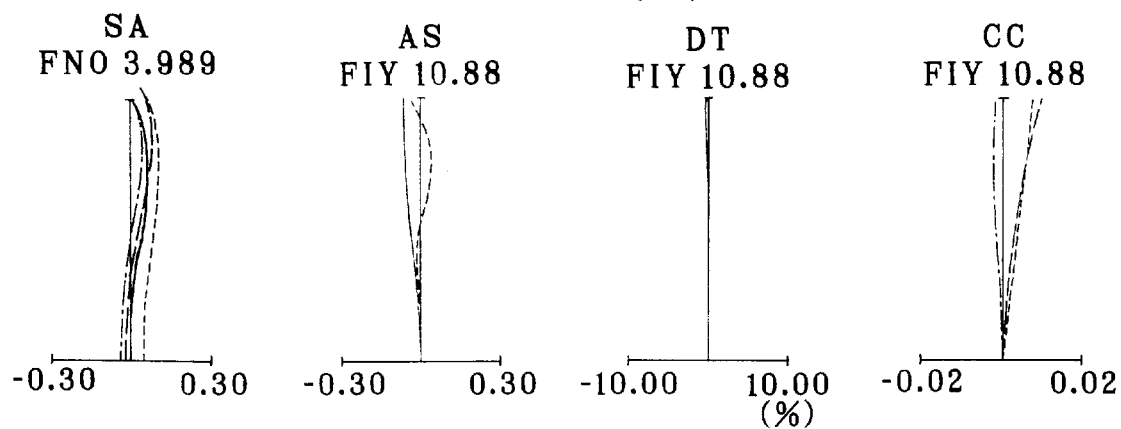
Figure 9C:
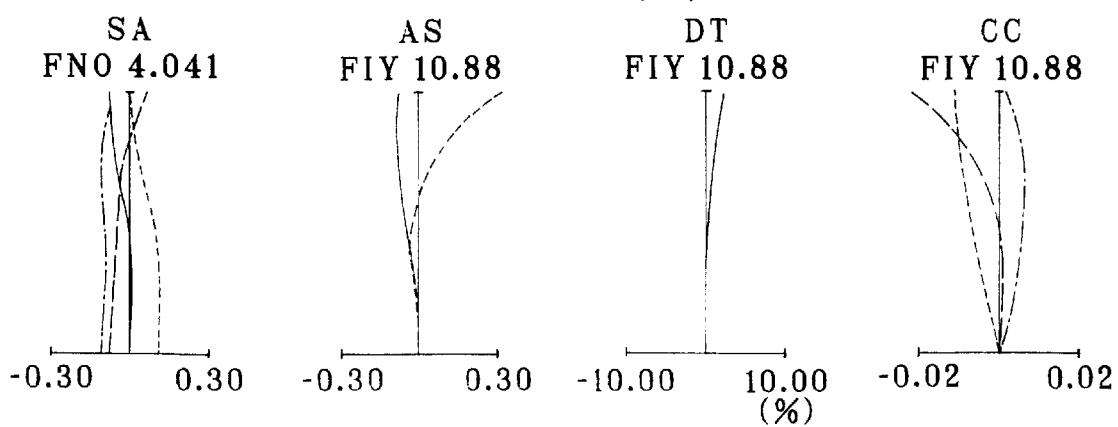

Aberration diagrams for this example upon focused at infinity are shown in FIGS. 8(*a*), 8(*b*) and 8(*c*), and those upon focused to 2 m are shown in FIGS. 9(*a*), 9(*b*) and 9(*c*).

Set out below are the numerical data on each example. The symbols used hereinafter but not hereinbefore have the following meanings.

f: focal length of the zoom lens system,
2ω: field angle,
$F_{NO}$: F-number,
FB: back focus,
WE: wide-angle end,
ST: intermediate settings,
TE: telephoto end,
$r_1, r_2, \ldots$: radius of curvature of each lens surface,
$d_1, d_2, \ldots$: spacing between adjacent lens surfaces,
$n_{d1}, n_{d2}, \ldots$: d-line refractive index of each lens, and
$\nu_{d1}, \nu_{d2}, \ldots$: Abbe constant of each lens.

Here let x represent an optical axis wherein the direction of propagation of light is positive and y indicate a direction perpendicular with respect to the optical axis. Then, aspherical shape is given by:

$$x = (y^2/r)/[1+\{1-(K+1)(y/r)^2\}^{1/2}] + A_4 y^4 + A_6 y^6 + A_8 y^8 + A_{10} y^{10}$$

where r is a paraxial radius of curvature, K is a conical coefficient, and $A_4, A_6, A_8$ and $A_{10}$ are fourth, sixth, eighth and tenth aspherical coefficients, respectively.

Example 1

| | | | | | | | |
|---|---|---|---|---|---|---|---|
| $r_1 =$ | 66.507 | $d_1 =$ | 1.600 | $n_{d1} =$ | 1.80518 | $\nu_{d1} =$ | 25.42 |
| $r_2 =$ | 45.577 | $d_2 =$ | 8.900 | $n_{d2} =$ | 1.49700 | $\nu_{d2} =$ | 81.54 |
| $r_3 =$ | −600.351 | $d_3 =$ | 0.110 | | | | |
| $r_4 =$ | 43.186 | $d_4 =$ | 5.350 | $n_{d3} =$ | 1.48749 | $\nu_{d3} =$ | 70.23 |
| $r_5 =$ | 137.297 | $d_5 =$ | (Variable) | | | | |
| $r_6 =$ | 77.493 | $d_6 =$ | 0.900 | $n_{d4} =$ | 1.77250 | $n_{d4} =$ | 49.60 |
| (Aspheric) | | | | | | | |
| $r_7 =$ | 14.175 | $d_7 =$ | 5.378 | | | | |
| $r_8 =$ | −36.814 | $d_8 =$ | 0.700 | $n_{d5} =$ | 1.77250 | $n_{d5} =$ | 49.60 |
| (Aspheric) | | | | | | | |
| $r_9 =$ | 22.348 | $d_9 =$ | 0.100 | | | | |
| $r_{10} =$ | 18.452 | $d_{10} =$ | 3.850 | $n_{d6} =$ | 1.84666 | $\nu_{d6} =$ | 23.78 |
| $r_{11} =$ | −149.493 | $d_{11} =$ | 1.277 | | | | |
| $r_{12} =$ | −23.224 | $d_{12}$ | 0.734 | $n_{d7} =$ | 1.69680 | $\nu_{d7} =$ | 55.53 |
| $r_{13} =$ | 190.053 | $d_{13} =$ | (Variable) | | | | |
| $r_{14} =$ | ∞ (Stop) | $d_{14} =$ | 0.600 | | | | |
| $r_{15} =$ | 23.051 | $d_{15} =$ | 3.650 | $n_{d8} =$ | 1.49700 | $\nu_{d8} =$ | 81.54 |
| (Aspheric) | | | | | | | |
| $r_{16} =$ | −13.952 | $d_{16} =$ | 0.550 | $n_{d9} =$ | 1.80518 | $\nu_{d9} =$ | 25.42 |
| $r_{17} =$ | −17.908 | $d_{17} =$ | (Variable) | | | | |
| $r_{18} =$ | −32.173 | $d_{18} =$ | 1.950 | $n_{d10} =$ | 1.84666 | $\nu_{d10} =$ | 23.78 |
| $r_{19} =$ | −16.991 | $d_{19} =$ | 0.700 | $n_{d11} =$ | 1.77250 | $\nu_{d11} =$ | 49.60 |
| $r_{20} =$ | 85.334 | $d_{20} =$ | (Variable) | | | | |
| $r_{21} =$ | 54.213 | $d_{21} =$ | 7.000 | $n_{d12} =$ | 1.69680 | $\nu_{d12} =$ | 55.53 |
| $r_{22} =$ | −28.881 | $d_{22} =$ | 0.700 | $n_{d13} =$ | 1.75520 | $\nu_{d13} =$ | 27.51 |
| $r_{23} =$ | 213.399 | $d_{23} =$ | 0.100 | | | | |
| $r_{24} =$ | 35.509 | $d_{24} =$ | 7.350 | $n_{d14} =$ | 1.49700 | $\nu_{d14} =$ | 81.54 |
| (Aspheric) | | | | | | | |
| $r_{25} =$ | −27.183 | | | | | | |
| (Aspheric) | | | | | | | |

Aspherical Coefficients

6th surface $K = 0.0000$
$A_4 = 2.9728 \times 10^{-6}$
$A_6 = 6.5575 \times 10^{-8}$
$A_8 = 3.3384 \times 10^{-10}$
$A_{10} = 0.0000$ 8th surface $K = 0.0000$
$A_4 = -1.3062 \times 10^{-5}$
$A_6 = -2.5198 \times 10^{-7}$
$A_8 = -3.8111 \times 10^{-9}$
$A_{10} = 1.2553 \times 10^{-11}$ 15th surface $K = 0.0000$
$A_4 = -4.9722 \times 10^{-5}$
$A_6 = 6.9448 \times 10^{-8}$
$A_8 = 1.9602 \times 10^{-10}$
$A_{10} = -6.3021 \times 10^{-12}$ 24th surface $K = 0.0000$
$A_4 = -1.5614 \times 10^{-5}$
$A_6 = 9.3186 \times 10^{-9}$
$A_8 = -1.2621 \times 10^{-11}$
$A_{10} = 5.0508 \times 10^{-14}$ -continued 25th surface K = 0.0000
$A_4 = 9.7203 \times 10^{-6}$
$A_6 = 4.7647 \times 10^{-9}$
$A_8 = -2.3939 \times 10^{-11}$
$A_{10} = 1.2014 \times 10^{-13}$ Zooming data (∞)

|  | WE | ST | TE |
|---|---|---|---|
| f (mm) | 14.374 | 40.012 | 139.385 |
| $F_{NO}$ | 3.496 | 4.050 | 4.476 |
| 2ω (°) | 76.5 | 30.3 | 6.2 |
| FB (mm) | 39.076 | 52.334 | 49.139 |
| $d_5$ | 0.970 | 15.778 | 40.000 |
| $d_{13}$ | 10.996 | 6.556 | 1.210 |
| $d_{17}$ | 1.099 | 17.089 | 20.000 |
| $d_{20}$ | 19.300 | 4.747 | 0.958 |

Example 2

| $r_1$ = | 74.612 | $d_1$ = | 1.600 | $n_{d1}$ = | 1.80518 | $\nu_{d1}$ = | 25.42 |
| $r_2$ = | 47.537 | $d_2$ = | 8.900 | $n_{d2}$ = | 1.49700 | $\nu_{d2}$ = | 81.54 |
| $r_3$ = | -911.563 | $d_3$ = | 0.110 | | | | |
| $r_4$ = | 46.118 | $d_4$ = | 5.350 | $n_{d3}$ = | 1.60300 | $\nu_{d3}$ = | 65.44 |
| $r_5$ = | 159.851 | $d_5$ = | (Variable) | | | | |
| $r_6$ = | 28.606 | $d_6$ = | 0.900 | $n_{d4}$ = | 1.77250 | $\nu_{d4}$ = | 49.60 |
| (Aspheric) | | | | | | | |
| $r_7$ = | 10.687 | $d_7$ = | 5.378 | | | | |
| $r_8$ = | -33.696 | $d_8$ = | 0.700 | $n_{d5}$ = | 1.77250 | $\nu_{d5}$ = | 49.60 |
| (Aspheric) | | | | | | | |
| $r_9$ = | 27.451 | $d_9$ = | 0.100 | | | | |
| $r_{10}$ = | 17.603 | $d_{10}$ = | 5.010 | $n_{d6}$ = | 1.84666 | $\nu_{d6}$ = | 23.78 |
| $r_{11}$ = | -194.977 | $d_{11}$ = | 1.277 | | | | |
| $r_{12}$ = | -28.639 | $d_{12}$ = | 1.433 | $n_{d7}$ = | 1.69680 | $\nu_{d7}$ = | 55.53 |
| $r_{13}$ = | 47.839 | $d_{13}$ = | (Variable) | | | | |
| $r_{14}$ = | ∞ (Stop) | $d_{14}$ = | 0.600 | | | | |
| $r_{15}$ = | 22.954 | $d_{15}$ = | 3.300 | $n_{d8}$ = | 1.49700 | $\nu_{d8}$ = | 81.54 |
| (Aspheric) | | | | | | | |
| $r_{16}$ = | -12.112 | $d_{16}$ = | 0.550 | $n_{d9}$ = | 1.74077 | $\nu_{d9}$ = | 27.79 |
| $r_{17}$ = | -16.744 | $d_{17}$ = | (Variable) | | | | |
| $r_{18}$ = | -29.364 | $d_{18}$ = | 1.950 | $n_{d10}$ = | 1.84666 | $\nu_{d10}$ = | 23.78 |
| $r_{19}$ = | -17.758 | $d_{19}$ = | 0.700 | $n_{d11}$ = | 1.74100 | $\nu_{d11}$ = | 52.64 |
| $r_{20}$ = | 94.970 | $d_{20}$ = | (Variable) | | | | |
| $r_{21}$ = | 59.891 | $d_{21}$ = | 7.000 | $n_{d12}$ = | 1.69680 | $\nu_{d12}$ = | 55.53 |
| $r_{22}$ = | -30.051 | $d_{22}$ = | 0.700 | $n_{d13}$ = | 1.76182 | $\nu_{d13}$ = | 26.52 |
| $r_{23}$ = | 1176.038 | $d_{23}$ = | 0.100 | | | | |
| $r_{24}$ = | 38.852 | $d_{24}$ = | 7.350 | $n_{d14}$ = | 1.49700 | $\nu_{d14}$ = | 81.54 |
| (Aspheric) | | | | | | | |
| $r_{25}$ = | -27.714 | | | | | | |
| (Aspheric) | | | | | | | |

Aspherical Coefficients

6th surface

K = 0.0000
$A_4 = -2.2062 \times 10^{-5}$
$A_6 = -4.9756 \times 10^{-8}$
$A_8 = 4.3530 \times 10^{-10}$
$A_{10} = 0.0000$ 8th surface K = 0.0000
$A_4 = 2.3875 \times 10^{-5}$
$A_6 = -7.6468 \times 10^{-8}$
$A_8 = -1.0527 \times 10^{-9}$
$A_{10} = -1.1541 \times 10^{-11}$ 15th surface K = 0.0000
$A_4 = -5.1244 \times 10^{-5}$
$A_6 = 6.2498 \times 10^{-8}$
$A_8 = 7.3532 \times 10^{-10}$
$A_{10} = -1.1174 \times 10^{-11}$ -continued 24th surface K = 0.0000
$A_4 = -1.3406 \times 10^{-5}$
$A_6 = 1.1307 \times 10^{-8}$
$A_8 = -3.6329 \times 10^{-11}$
$A_{10} = 1.0256 \times 10^{-13}$ 25th surface K = 0.0000
$A_4 = 9.6391 \times 10^{-6}$
$A_6 = 7.7181 \times 10^{-9}$
$A_8 = -4.4855 \times 10^{-11}$
$A_{10} = 1.5297 \times 10^{-13}$ (∞)

|  | WE | ST | TE |
|---|---|---|---|
| f (mm) | 14.376 | 40.209 | 139.388 |
| $F_{NO}$ | 3.566 | 4.181 | 4.261 |
| 2ω (°) | 76.8 | 29.7 | 8.6 |
| FB (mm) | 38.186 | 46.639 | 41.437 |
| $d_5$ | 0.970 | 15.778 | 39.992 |
| $d_{13}$ | 10.453 | 7.129 | 1.210 |
| $d_{17}$ | 1.273 | 21.838 | 23.309 |
| $d_{20}$ | 19.300 | 3.606 | 0.958 |

Example 3

| $r_1$ = | 71.732 | $d_1$ = | 1.600 | $n_{d1}$ = | 1.80518 | $\nu_{d1}$ = | 25.42 |
| $r_2$ = | 47.237 | $d_2$ = | 8.900 | $n_{d2}$ = | 1.48749 | $\nu_{d2}$ = | 70.23 |
| $r_3$ = | -398.817 | $d_3$ = | 0.110 | | | | |
| $r_4$ = | 42.021 | $d_4$ = | 5.350 | $n_{d3}$ = | 1.49700 | $\nu_{d3}$ = | 81.54 |
| $r_5$ = | 149.196 | $d_5$ = | (Variable) | | | | |
| $r_6$ = | -147.617 | $d_6$ = | 0.900 | $n_{d4}$ = | 1.77250 | $\nu_{d4}$ = | 49.60 |
| (Aspheric) | | | | | | | |
| $r_7$ = | 16.774 | $d_7$ = | 5.378 | | | | |
| $r_8$ = | -22.211 | $d_8$ = | 0.700 | $n_{d5}$ = | 1.69680 | $\nu_{d5}$ = | 55.53 |
| (Aspheric) | | | | | | | |
| $r_9$ = | -48.234 | $d_9$ = | 0.100 | | | | |
| $r_{10}$ = | 69.838 | $d_{10}$ = | 2.770 | $n_{d6}$ = | 1.84666 | $\nu_{d6}$ = | 23.78 |
| $r_{11}$ = | -38.510 | $d_{11}$ = | 1.277 | | | | |
| $r_{12}$ = | -17.468 | $d_{12}$ = | 0.700 | $n_{d7}$ = | 1.72916 | $\nu_{d7}$ = | 54.68 |
| $r_{13}$ = | -2365.754 | $d_{13}$ = | (Variable) | | | | |
| $r_{14}$ = | ∞ (Stop) | $d_{14}$ = | 0.600 | | | | |
| $r_{15}$ = | 27.369 | $d_{15}$ = | 4.600 | $n_{d8}$ = | 1.48749 | $\nu_{d8}$ = | 70.23 |
| (Aspheric) | | | | | | | |
| $r_{16}$ = | -13.171 | $d_{16}$ = | 0.650 | $n_{d9}$ = | 1.63980 | $\nu_{d9}$ = | 34.46 |
| $r_{17}$ = | -19.067 | $d_{17}$ = | (Variable) | | | | |
| $r_{18}$ = | -37.480 | $d_{18}$ = | 1.950 | $n_{d10}$ = | 1.84666 | $\nu_{d10}$ = | 23.78 |
| $r_{19}$ = | -17.868 | $d_{19}$ = | 0.700 | $n_{d11}$ = | 1.77250 | $\nu_{d11}$ = | 49.60 |
| $r_{20}$ = | 131.487 | $d_{20}$ = | (Variable) | | | | |
| $r_{21}$ = | 63.502 | $d_{21}$ = | 7.000 | $n_{d12}$ = | 1.69680 | $\nu_{d12}$ = | 55.53 |
| $r_{22}$ = | -21.414 | $d_{22}$ = | 2.773 | $n_{d13}$ = | 1.72825 | $\nu_{d13}$ = | 28.46 |
| $r_{23}$ = | 176.117 | $d_{23}$ = | 1.253 | | | | |
| $r_{24}$ = | 35.052 | $d_{24}$ = | 7.350 | $n_{d14}$ = | 1.49700 | $\nu_{d14}$ = | 81.54 |
| (Aspheric) | | | | | | | |
| $r_{25}$ = | -30.067 | | | | | | |
| (Aspheric) | | | | | | | |

Aspherical Coefficients

6th surface

K = 0.0000
$A_4 = 2.9362 \times 10^{-5}$
$A_6 = -1.3687 \times 10^{-8}$
$A_8 = 3.7527 \times 10^{-10}$
$A_{10} = 0.0000$ 8th surface K = 0.0000
$A_4 = -6.2800 \times 10^{-7}$
$A_6 = 1.2118 \times 10^{-7}$
$A_8 = -7.9695 \times 10^{-9}$
$A_{10} = 6.1511 \times 10^{-11}$ -continued 15th surface K = 0.0000
$A_4$ = −3.9638 × 10$^{-5}$
$A_6$ = 1.1506 × 10$^{-7}$
$A_8$ = −2.7496 × 10$^{-10}$
$A_{10}$ = 4.4450 × 10$^{-12}$ 24th surface K = 0.0000
$A_4$ = −1.1293 × 10$^{-5}$
$A_6$ = 6.9776 × 10$^{-9}$
$A_8$ = −3.6914 × 10$^{-11}$
$A_{10}$ = 1.4997 × 10$^{-13}$ 25th surface K = 0.0000
$A_4$ = 8.1880 × 10$^{-6}$
$A_6$ = 9.6575 × 10$^{-9}$
$A_8$ = −7.6566 × 10$^{-11}$
$A_{10}$ = 2.5510 × 10$^{-13}$
(∞)

|  | WE | ST | TE |
|---|---|---|---|
| f (mm) | 14.360 | 39.999 | 139.500 |
| $F_{NO}$ | 3.545 | 4.003 | 4.525 |
| 2ω (°) | 77.9 | 30.5 | 8.6 |
| FB (mm) | 36.515 | 51.844 | 33.453 |
| $d_5$ | 0.970 | 15.778 | 40.000 |
| $d_{13}$ | 15.400 | 5.171 | 1.210 |
| $d_{17}$ | 1.000 | 14.747 | 32.000 |
| $d_{20}$ | 20.224 | 5.799 | 1.792 |

Enumerated below are the values of conditions (1) to (9) in each example.

|  | (1) | (2) | (3) | (4) | (5) |
|---|---|---|---|---|---|
| Example 1 | 5.032 | 0.722 | 0.735 | 1.0176 | 0.86 |
| Example 2 | 4.939 | 0.711 | 0.6737 | 0.9747 | 0.829 |
| Example 3 | 4.931 | 0.8174 | 0.5054 | 0.7974 | 0.5936 |

|  | (6) | (7) | (8) | (9) |
|---|---|---|---|---|
| Example 1 | 24.191 | 2.773 | 0.739 | 4.704 |
| Example 2 | 23.2858 | 2.555 | 0.483 | 5.0377 |
| Example 3 | 21.885 | 2.3918 | 0.662 | 5.2314 |

Thus, the present invention can provide a zoom lens system comprising, in order from its object side, a first lens group of positive refracting power, a second lens group of negative refracting power, a third lens group of positive refracting power, a fourth lens group of negative refracting power and a fifth lens group of positive refracting power wherein focusing is carried out by moving the first and second lens group as an integral unit, moving the second lens group, or moving both the fourth and the fifth lens group, thereby achieving a novel focusing method. The zoom lens system having such refracting power profiles as explained above, when used in such a focusing mode with reduced fluctuations of aberrations with focusing, may be utilized, with great effects, in wide applications including future wide-angle, high-magnification zoom lenses for video, still video or other purposes.

I claim:

1. A zoom lens system comprising in order from an object side thereof, a first lens group having positive refracting power, a second lens group having negative refracting power, a third lens group having positive refracting power, a fourth lens group having negative refracting power and a fifth lens group having positive refracting power, wherein:

for zooming from a wide angle end to a telephoto end of said zoom lens system, said first lens group to said fifth lens group are all movable, during said zooming, said first lens group and said third lens group move toward said object side in such a way that a spacing between said first lens group and said second lens group becomes wide and a spacing between said third lens group and said fourth lens group becomes wide, at least said fourth lens group or said fifth lens group makes a non-linear movement, thereby compensating for a fluctuation of an image plane position with zooming, and focusing to an finite object is carried out by moving said first lens group and second lens group as an integral unit, which satisfies the following conditions upon zooming from the wide-angle end to the telephoto end:

$$1.6 < \Delta_{1T}/f_W < 5.0 \qquad (7)$$

$$0.4 < \Delta_{3T}/f_W < 4.0 \qquad (8)$$

where $\Delta_{1T}$ is an amount of zooming movement of the first lens group to the telephoto end as measured on a wide-angle end basis, and $\Delta_{3T}$ is an amount of zooming movement of the third lens group to the telephoto end as measured on a wide-angle end basis.

2. The zoom lens system according to claim 1, which satisfies the following conditions:

$$2.0 < f_1/f_W < 8.0 \qquad (1)$$

$$0.4 < |f_2/f_W| < 1.0 \qquad (2)$$

$$0.3 < f_3/f_{T345} < 1.2 \qquad (3)$$

$$0.6 < |f_4|/f_{T345} < 5.0 \qquad (4)$$

$$0.5 < f_5/f_{T345} < 4.0 \qquad (5)$$

where:

$f_w$ is a focal length of the zoom lens system at the wide angle end, $f_1$ is a focal length of the first lens group, $f_2$ is a focal length of the second lens group, $f_3$ is a focal length of the third lens group, $f_4$ is a focal length of the fourth lens group, $f_5$ is a focal length of the fifth lens group, and $f_{T345}$ is a focal length of the third to fifth lens groups at the telephoto end.

3. The zoom lens system according to claim 1, wherein a focal length of the zoom lens system at the wide-angle end is shorter than an effective diagonal length of an image-formation plane of the optical system, or an image pickup device.

4. The zoom lens system according to claim 1, wherein a chief ray emanating from the optical system is determined based on the following condition:

$$10 < |Expd_W \times Y|/L_W \qquad (6)$$

where $Expd_W$ is an optical axis distance from an image-formation plane position to an exit pupil, Y is an actual maximum image height at an image-formation plane, and $L_W$ is an optical axis distance from an apex of a surface located nearest to the object side in the first lens group, as measured at the wide-angle end, to the image-formation plane.

5. The zoom lens system according to claim 1, wherein the second lens group has a paraxial transverse magnification conforming to the following condition:

$$2.5 < \beta_{2T}/\beta_{2W} < 7 \quad (9)$$

where $B_{2W}$ is an image-formation magnification of the second lens group at the wide-angle end, and $B_{2T}$ is an image-formation magnification of the second lens group at the telephoto end.

6. A zoom lens system comprising in order from an object side thereof, a first lens group having positive refracting power, a second lens group having negative refracting power, a third lens group having positive refracting power, a fourth lens group having negative refracting power and a fifth lens group having positive refracting power, wherein:

for zooming from a wide angle end to a telephoto end of said zoom lens system, said first lens group to said fifth lens group are all movable, during said zooming, said first lens group and said third lens group move toward said object side in such a way that a spacing between said first lens group and said second lens group becomes wide and a spacing between said third lens group and said fourth lens group becomes wide, at least said fourth lens group or said fifth lens group makes a non-linear movement, thereby compensating for a fluctuation of an image plane position with zooming, and focusing carried out by moving said second lens group, which satisfies the following conditions upon zooming from the wide-angle end to the telephoto end:

$$1.6 < \Delta_{1T}/f_W < 5.0 \quad (7)$$

$$0.4 < \Delta_{3T}/f_W < 4.0 \quad (8)$$

where $\Delta_{1T}$ is an amount of zooming movement of the first lens group to the telephoto end as measured on a wide-angle end basis, and $\Delta_{3T}$ is an amount of zooming movement of the third lens group to the telephoto end as measured on a wide-angle end basis.

7. The zoom lens system according to claim 6, which satisfies the following conditions:

$$2.0 < f_1/f_W < 8.0 \quad (1)$$

$$0.4 < |f_2/f_W| < 1.0 \quad (2)$$

$$0.3 < f_3/f_{T345} < 1.2 \quad (3)$$

$$0.6 < |f_4|/f_{T345} < 5.0 \quad (4)$$

$$0.5 < f_5/f_{T345} < 4.0 \quad (5)$$

where:

$f_W$ is a focal length of the zoom lens system at the wide angle end, $f_1$ is a focal length of the first lens group, $f_2$ is a focal length of the second lens group, $f_3$ is a focal length of the third lens group, $f_4$ is a focal length of the fourth lens group, $f_5$ is a focal length of the fifth lens group, and $f_{T345}$ is a focal length of the third to fifth lens groups at the telephoto end.

8. The zoom lens system according to claim 6, wherein a focal length of the zoom lens system at the wide-angle end is shorter than an effective diagonal length of an image-formation plane of the optical system, or an image pickup device.

9. The zoom lens system according to claim 6, wherein a chief ray emanating from the optical system is determined based on the following condition:

$$10 < |Expd_W \times Y|/L_W \quad (6)$$

where $Expd_W$, is an optical axis distance from an image-formation plane position to an exit pupil, Y is an actual maximum image height at an image-formation plane, and $L_W$ is an optical axis distance from an apex of a surface located nearest to the object side in the first lens group, as measured at the wide-angle end, to the image-formation plane.

10. The zoom lens system according to claim 6, wherein the second lens group has a paraxial transverse magnification conforming to the following condition:

$$2.5 < \beta_{2T}/\beta_{2W} < 7 \quad (9)$$

where $\beta_{2W}$ is an image-formation magnification of the second lens group at the wide-angle end, and $\beta_{2T}$ is an image-formation magnification of the second lens group at the telephoto end.

11. A zoom lens system comprising in order from an object side thereof, a first lens group having positive refracting power, a second lens group having negative refracting power, a third lens group having positive refracting power, a fourth lens group having negative refracting power and a fifth lens group having positive refracting power, wherein:

for zooming from a wide angle end to a telephoto end of said zoom lens system, said first lens group to said fifth lens group are all movable, during said zooming, said first lens group and said third lens group move toward said object side in such a way that a spacing between said first lens group and said second lens group becomes wide and a spacing between said third lens group and said fourth lens group becomes wide, at least said fourth lens group or said fifth lens group makes a non-linear movement, thereby compensating for a fluctuation of an image plane position with zooming, and focusing to an finite object is carried out by moving both said fourth lens group and said fifth lens group, which satisfies the following conditions upon zooming from the wide-angle end to the telephoto end:

$$1.6 < \Delta_{1T}/f_W < 5.0 \quad (7)$$

$$0.4 < \Delta_{3T}/f_W < 4.0 \quad (8)$$

where $\Delta_{1T}$ is an amount of zooming movement of the first lens group to the telephoto end as measured on a wide-angle end basis, and $\Delta_{3T}$ is an amount of zooming movement of the third lens group to the telephoto end as measured on a wide-angle end basis.

12. The zoom lens system according to claim 11, which satisfies the following conditions:

$$2.0 < f_1/f_W < 8.0 \quad (1)$$

$$0.4 < |f_2/f_W| < 1.0 \quad (2)$$

$$0.3 < f_3/f_{T345} < 1.2 \quad (3)$$

$$0.6 < |f_4|/f_{T345} < 5.0 \quad (4)$$

$$0.5 < f_5/f_{T345} < 4.0 \quad (5)$$

where:

$f_W$ is a focal length of the zoom lens system at the wide angle end, $f_1$ is a focal length of the first lens group,
$f_2$ is a focal length of the second lens group,
$f_3$ is a focal length of the third lens group,
$f_4$ is a focal length of the fourth lens group,
$f_5$ is a focal length of the fifth lens group, and
$f_{T345}$ is a focal length of the third to fifth lens groups at the telephoto end.

13. The zoom lens system according to claim 11, wherein a focal length of the zoom lens system at the wide-angle end is shorter than an effective diagonal length of an image formation plane of the optical system, or an image pickup device.

14. The zoom lens system according to claim 11, wherein a chief ray emanating from the optical system is determined based on the following condition:

$$10 < |Expd_W \times Y|/L_W \quad (6)$$

where $Expd_W$ is an optical axis distance from an image-formation plane position to an exit pupil, Y is an actual maximum image height at an image-formation plane, and $L_W$ is an optical axis distance from an apex of a surface located nearest to the object side in the first lens group, as measured at the wide-angle end, to the image-formation plane.

15. The zoom lens system according to claim 11, wherein the second lens group has a paraxial transverse magnification conforming to the following condition:

$$2.5 < \beta_{2T}/\beta_{2W} < 7 \quad (9)$$

where $\beta_{2W}$ is an image-formation magnification of the second lens group at the wide-angle end, and $\beta_{2T}$ is an image-formation magnification of the second lens group at the telephoto end.

16. A zoom lens system consisting of in order from an object side thereof, a first lens group having positive refracting power, a second lens group having negative refracting power, a third lens group having positive refracting power, a fourth lens group having negative refracting power and a fifth lens group having positive refracting power, wherein:
for zooming from a wide angle end to a telephoto end of said zoom lens system, said first lens group to said fifth lens group are all movable,
during said zooming, said first lens group and said third lens group move toward said object side in such a way that a spacing between said first lens group and said second lens group becomes wide and a spacing between said third lens group and said fourth lens group becomes wide,
at least said fourth lens group or said fifth lens group makes a non-linear movement, thereby compensating for a fluctuation of an image plane position with zooming, and
focusing is carried out by moving said first lens group and second lens group as an integral unit,
said third lens group consists of two lens elements and said fifth lens group consists of three lens elements.

17. A zoom lens system consisting of in order from an object side thereof, a first lens group having positive refracting power, a second lens group having negative refracting power, a third lens group having positive refracting power, a fourth lens group having negative refracting power and a fifth lens group having positive refracting power, wherein:
for zooming from a wide angle end to a telephoto end of said zoom lens system, said first lens group to said fifth lens group are all movable,
during said zooming, said first lens group and said third lens group move toward said object side in such a way that a spacing between said first lens group and said second lens group becomes wide and a spacing between said third lens group and said fourth lens group becomes wide,
at least said fourth lens group or said fifth lens group makes a non-linear movement, thereby compensating for a fluctuation of an image plane position with zooming, and
focusing is carried out by moving said second lens group,
said third lens group consists of two lens elements and said fifth lens group consists of three lens elements.

18. A zoom lens system comprising in order from an object side thereof, a first lens group having positive refracting power, a second lens group having negative refracting power, a third lens group having positive refracting power, a fourth lens group having negative refracting power and a fifth lens group having positive refracting power, wherein:
for zooming from a wide angle end to a telephoto end of said zoom lens system, said first lens group to said fifth lens group are all movable,
during said zooming, said first lens group and said third lens group move toward said object side in such a way that a spacing between said first lens group and said second lens group becomes wide and a spacing between said third lens group and said fourth lens group becomes wide,
at least said fourth lens group or said fifth lens group makes a non-linear movement, thereby compensating for a fluctuation of an image plane position with zooming, and
focusing is carried out by moving both said fourth lens group and said fifth lens group,
said third lens group consists of two lens elements and said fifth lens group consists of three lens elements.

19. A zoom lens system consisting of in order from an object side thereof, a first lens group having positive refracting power, a second lens group having negative refracting power, a third lens group having positive refracting power, a fourth lens group having negative refracting power and a fifth lens group having positive refracting power, wherein:
for zooming from a wide angle end to a telephoto end of said zoom lens system, said first lens group to said fifth lens group are all movable,
during said zooming, said first lens group and said third lens group move toward said object side in such a way that a spacing between said first lens group and said second lens group becomes wide and a spacing between said third lens group and said fourth lens group becomes wide,
at least said fourth lens group or said fifth lens group makes a non-linear movement, thereby compensating for a fluctuation of an image plane position with zooming, and
focusing is carried out by moving said first lens group and second lens group as an integral unit,
said third lens group consists of one lens component and said fifth lens group consist of two lens components.

20. A zoom lens system consisting of in order from an object side thereof, a first lens group having positive refracting power, a second lens group having negative refracting power, a third lens group having positive refracting power, a fourth lens group having negative refracting power and a fifth lens group having positive refracting power, wherein:

for zooming from a wide angle end to a telephoto end of said zoom lens system, said first lens group to said fifth lens group are all movable, during said zooming, said first lens group and said third lens group move toward said object side in such a way that a spacing between said first lens group and said second lens group becomes wide and a spacing between said third lens group and said fourth lens group becomes wide, at least said fourth lens group or said fifth lens group makes a non-linear movement, thereby compensating for a fluctuation of an image plane position with zooming, and focusing carried out by moving said second lens group, said third lens group consists of one lens component and said fifth lens group consists of two lens components.

21. A zoom lens system comprising in order from an object side thereof, a first lens group having positive refracting power, a second lens group having negative refracting power, a third lens group having positive refracting power, a fourth lens group having negative refracting power and a fifth lens group having positive refracting power, wherein:

for zooming from a wide angle end to a telephoto end of said zoom lens system, said first lens group to said fifth lens group are all movable, during said zooming, said first lens group and said third lens group move toward said object side in such a way that a spacing between said first lens group and said second lens group becomes wide and a spacing between said third lens group and said fourth lens group becomes wide, at least said fourth lens group or said fifth lens group makes a non-linear movement, thereby compensating for a fluctuation of an image plane position with zooming, and focusing to an finite object is carried out by moving both said fourth lens group and said fifth lens group, said third lens group consists of one lens component and said fifth lens group consists of two lens components.

* * * * *

UNITED STATES PATENT AND TRADEMARK OFFICE
CERTIFICATE OF CORRECTION

PATENT NO. : 6,631,034 B2
DATED : October 7, 2003
INVENTOR(S) : Takanori Yamanashi It is certified that error appears in the above-identified patent and that said Letters Patent is hereby corrected as shown below:

Title page,
Item [57], ABSTRACT,
Replace "A compact zoom lens system maintains sufficient image-format"... with
-- A compact zoom lens system maintains sufficient image-formation capabilities at a wide-angle end of greater than 70° and at a zoom ratio of greater than about 10. The zoom lens system comprises a positive first lens group, a negative second lens group, a positive third lens group, a negative fourth lens group, and a positive fifth lens group. For zooming from a wide-angle end to a telephoto end, the first to fifth lens groups are all movable. The first and third lens groups move toward the object side. Also, the spaces between the first and second lens groups and between the third and fourth lens groups widen. At least the fourth lens group or the fifth lens group makes a non-linear movement, compensating for a fluctuation of an image plane position with zooming. Focusing is carried out by moving the first and second lens groups as an integral unit. --.

Signed and Sealed this

Thirteenth Day of July, 2004

JON W. DUDAS
*Acting Director of the United States Patent and Trademark Office*